US008148881B2

(12) United States Patent
Yoneyama

(10) Patent No.: US 8,148,881 B2
(45) Date of Patent: Apr. 3, 2012

(54) VIBRATION SENSOR FILM, VIBRATION ACTUATOR FILM, VIBRATION REDUCTION FILM, AND MULTILAYER FILM USING THEM

(75) Inventor: Satoshi Yoneyama, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 129 days.

(21) Appl. No.: 12/697,909

(22) Filed: Feb. 1, 2010

(65) Prior Publication Data
US 2010/0194243 A1 Aug. 5, 2010

(30) Foreign Application Priority Data

Feb. 2, 2009 (JP) ................................ 2009-021793

(51) Int. Cl.
*H01L 41/047* (2006.01)

(52) U.S. Cl. ......... 310/366; 310/328; 310/338; 310/365

(58) Field of Classification Search .................. 310/320, 310/324, 328, 338, 365, 366
See application file for complete search history.

(56) References Cited

U.S. PATENT DOCUMENTS

| 6,510,738 | B1 * | 1/2003 | Lee et al. ........................ 73/579 |
| 6,987,346 | B2 * | 1/2006 | Yamada et al. ............... 310/320 |
| 7,288,878 | B1 * | 10/2007 | Feller ............................ 310/364 |
| 7,876,024 | B2 * | 1/2011 | Melz et al. .................... 310/328 |
| 2002/0130593 | A1 * | 9/2002 | Lee et al. ...................... 310/365 |

FOREIGN PATENT DOCUMENTS

| JP | 05-172839 A | 7/1993 |
| JP | 07-209072 A | 8/1995 |

* cited by examiner

*Primary Examiner* — Derek Rosenau
(74) *Attorney, Agent, or Firm* — Sughrue Mion, PLLC

(57) ABSTRACT

A vibration reduction system has a vibration reduction film and a control unit. The vibration reduction film is constituted of a vibration sensor film, an insulating layer, and a vibration actuator film that are stacked in this order. In each of the vibration sensor film and the vibration actuator film, two pairs of electrodes are formed on both surfaces of a piezoelectric polymer film into a pattern based on a particular mode of vibration. The electrodes of the vibration sensor film overlap with the electrodes of the vibration actuator film. In response to electric charge signals from the electrodes of the vibration sensor film, the particular mode of vibration is detected. By application of voltages into the electrodes of the vibration actuator film, a vibration of opposite phase is generated to counteract the detected vibration.

15 Claims, 21 Drawing Sheets

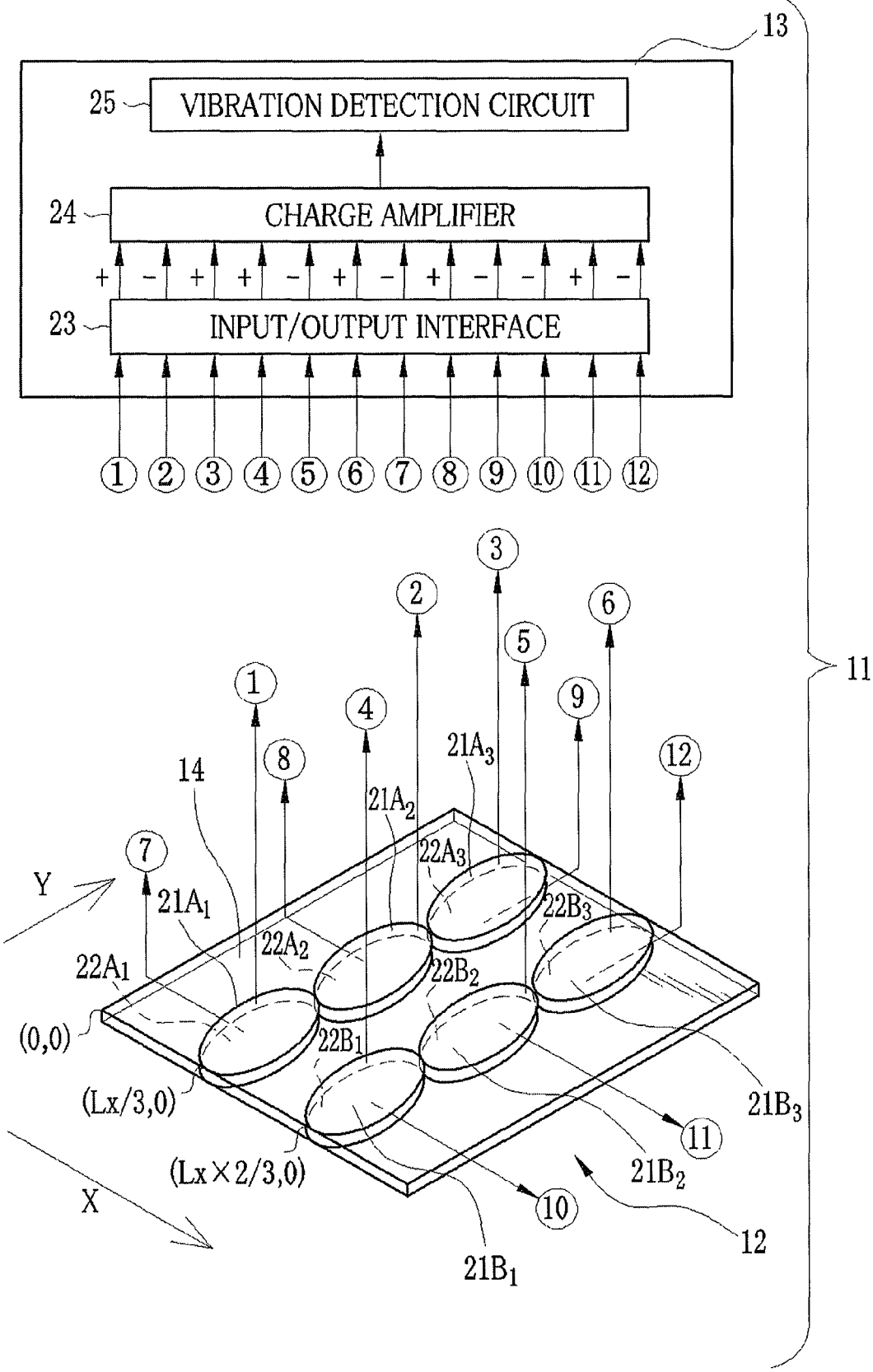

FIG. 6
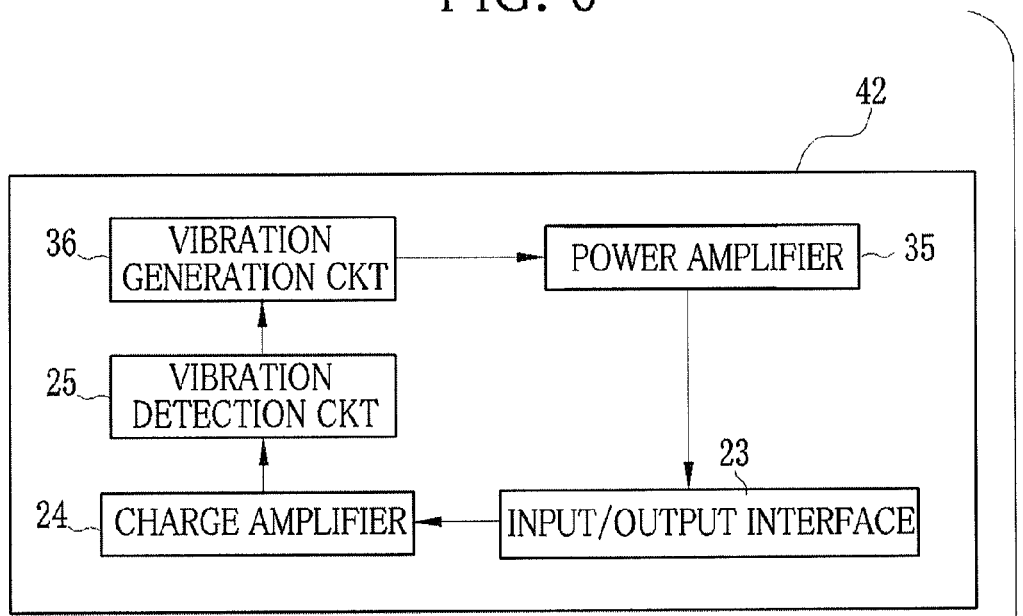
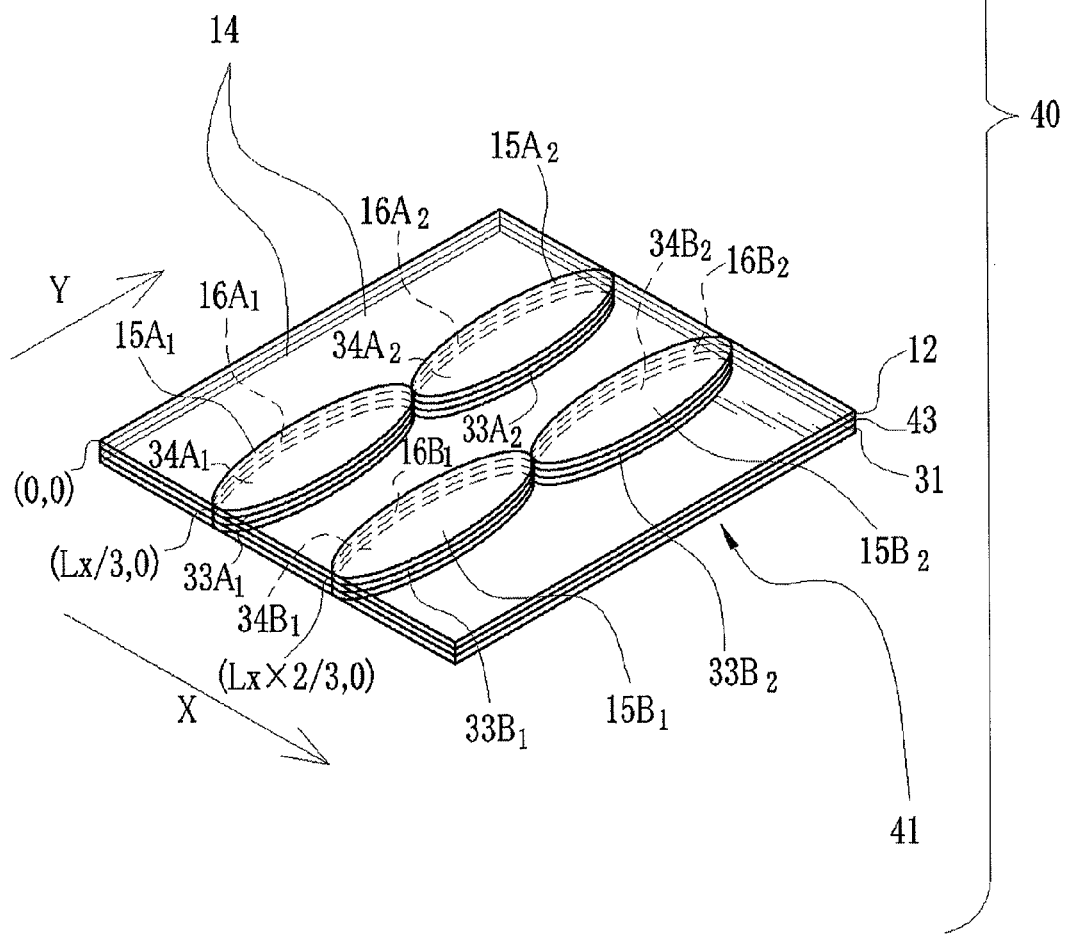

VIBRATION SENSOR FILM, VIBRATION ACTUATOR FILM, VIBRATION REDUCTION FILM, AND MULTILAYER FILM USING THEM

BACKGROUND OF THE INVENTION

1. Field of the Invention

The present invention relates to a vibration sensor film for detecting a particular mode of vibration, a vibration actuator film for generating the particular mode of vibration, a vibration reduction film for reducing the particular mode of vibration, and a multilayer film using the vibration sensor film, the vibration actuator film, or the vibration reduction film.

2. Description Related to the Prior Art

A piezoelectric sensor and a piezoelectric actuator that use a piezoelectric polymer film are conventionally known. In this piezoelectric sensor or the piezoelectric actuator, in general, the piezoelectric polymer film made of PVDF (polyvinylidene fluoride) is cut into a desired shape, and is glued on an object to be detected or driven.

In recent years, it is proposed to use the piezoelectric sensor for vibration detection, and use the piezoelectric actuator for vibration generation. According to Japanese Patent Laid-Open Publication No. 5-172839, for example, a piezoelectric vibration sensor is constituted of a base attached to an object to be measured, a sensing section, and a load body fixed on the sensing section. The sensing section includes a film-shaped piezoelectric body, which includes a piezoelectric film and mesh electrodes provided on both surfaces of the piezoelectric film, and support plates fixed on both surfaces of the piezoelectric body. The load body imposes on the piezoelectric film a load the weight of which depends on a vibration, and causes distortion of the piezoelectric film. Upon vibration of the object to be measured, voltage is outputted from the mesh electrodes in accordance with the distortion of the piezoelectric film, and thus the vibration is detected.

According to Japanese Patent Laid-Open Publication 7-209072, a vibration intensity detector is constituted of a rectangular polymeric piezoelectric film (piezoelectric polymer film), a plurality of electrodes, and a protection film for covering the piezoelectric polymer film and the electrodes. The electrodes are provided on both surfaces of the piezoelectric polymer film at regular intervals in a longitudinal direction so as to be opposed to each other. This detector is easily attached to an object to be measured by an adhesive, and gets output voltage in response to deformation of the object to be measured.

In the piezoelectric vibration sensor according to the Japanese Patent Laid-Open Publication No. 5-172839, the support plates are disposed on the mesh electrodes, and make it difficult to pull out wiring of the mesh electrodes. Also, the base and the support plates prevent reduction in the thickness of the piezoelectric vibration sensor.

The vibration intensity detector according to the Japanese Patent Laid-Open Publication No. 7-209072 is attached to the object to be measured for use. Thus, an attachment position error of the detector seriously affects its performance. Furthermore, the thickness of the detector attached to the object prevents integration of the object into a device, or causes upsizing of the device.

In addition, when the conventional piezoelectric sensor is attached to a random area of a plate, the piezoelectric sensor detects various modes of vibration in a mixed manner. As a result, if the piezoelectric actuator is operated to counteract the detected vibration, there is a case where the piezoelectric actuator generates an unnecessary mode of vibration, and contrarily increases the vibration.

Therefore, if a piezoelectric sensor can detect a particular mode of vibration and a piezoelectric actuator can generate the particular mode of vibration, the detection accuracy of the piezoelectric sensor and the driving accuracy of the piezoelectric actuator will be significantly improved. The above publications, however, do not consider it.

SUMMARY OF THE INVENTION

A main object of the present invention is to provide a vibration sensor film and a vibration actuator film that are thin and light in weight.

Another object of the present invention is to provide a vibration sensor film that can detect a particular mode of vibration, a vibration actuator film that can generate the particular mode of vibration, and a vibration reduction film using the vibration sensor film and the vibration detection film.

A vibration sensor film according to the present invention includes a piezoelectric polymer film of a plate form and at least one pair of first electrodes formed on the piezoelectric polymer film into a pattern based on a first particular mode of vibration. One of the first sensor electrodes in the pair is disposed on one surface of the piezoelectric polymer film, and the other one of the first sensor electrodes in the pair is disposed on the other surface of the piezoelectric polymer film. The pair of the first sensor electrodes outputs a signal, when the first particular mode of vibration is applied to the piezoelectric polymer film.

The piezoelectric polymer film has a quadrilateral shape, and is supported by a quadrilateral support frame at four sides. Otherwise, the piezoelectric polymer film has a quadrilateral shape, and is supported by a support member at one side.

It is preferable that the pair of the first sensor electrodes be formed on the surfaces of the piezoelectric polymer film by a photoresist method.

A pair of second sensor electrodes may be formed on the piezoelectric polymer film into a pattern based on a second particular mode of vibration. One of the second sensor electrodes in the pair is disposed on one surface of the piezoelectric polymer film, and the other one of the second sensor electrodes in the pair is disposed on the other surface of the piezoelectric polymer film.

It is preferable that the pattern is expressed by a sine function or a second order differentiation of an eigenfunction.

A vibration actuator film according to the present invention includes a piezoelectric polymer film of a plate form and a pair of first drive electrodes formed on the piezoelectric polymer film into a pattern based on a first particular mode of vibration. One of the first drive electrodes in the pair is disposed on one surface of the piezoelectric polymer film, and the other one of the first drive electrodes in the pair is disposed on the other surface of the piezoelectric polymer film. A voltage is applied to the pair of the first drive electrodes to generate the first particular mode of vibration in the piezoelectric polymer film.

In addition to the first drive electrodes, a pair of second drive electrodes may be formed on the piezoelectric polymer film into a pattern based on a second particular mode of vibration. One of the second drive electrodes in the pair is disposed on one surface of the piezoelectric polymer film, and the other one of the second drive electrodes in the pair is disposed on the other surface of the piezoelectric polymer film.

A vibration reduction film according to the present invention includes a piezoelectric polymer film of a plate form, a pair of sensor electrodes formed on the piezoelectric polymer film into a pattern based on a particular mode of vibration, and a pair of drive electrodes formed on the piezoelectric polymer film into the pattern based on the particular mode of vibration. One of the sensor electrodes in the pair is disposed on one surface of the piezoelectric polymer film, and the other one of the sensor electrodes in the pair is disposed on the other surface of the piezoelectric polymer film. The pair of the sensor electrodes outputs a signal, when the particular mode of vibration is applied to the piezoelectric polymer film. One of the drive electrodes in the pair is disposed on one surface of the piezoelectric polymer film, and the other one of the drive electrodes in the pair is disposed on the other surface of the piezoelectric polymer film. Upon detection of the particular mode of vibration, a voltage is applied to the pair of the drive electrodes, and generates a vibration having an opposite phase to that of the detected vibration in order to counteract the detected vibration.

The sensor electrodes and the drive electrodes may be formed into a comb shape or a mesh shape so as to be complementary with one another.

A multilayer film according to the present invention includes a plurality of piezoelectric polymer films stacked on one another via an insulating layer and a pair of electrodes formed on each of the piezoelectric polymer films into a pattern based on a particular mode of vibration. One of the electrodes in the pair is disposed on one surface of the piezoelectric polymer film, and the other one of the electrodes in the pair is disposed on the other surface of the piezoelectric polymer film.

The plurality of the piezoelectric polymer films may be vibration sensor films for detecting different modes of vibration from one another. The plurality of the piezoelectric polymer films may be vibration actuator films for generating different modes of vibration from one another. Otherwise, at least one of the plurality of the piezoelectric polymer films is a vibration sensor film for detecting the particular mode of vibration, and at least another one of the plurality of the piezoelectric polymer films is a vibration actuator film for generating the particular mode of vibration. The vibration actuator film generates a cancelling vibration having an opposite phase to that of the vibration detected by the vibration sensor film in order to counteract the detected vibration.

According to the present invention, it is possible to detect the particular mode of vibration with high accuracy, and counteract the detected vibration with high accuracy. Since the piezoelectric polymer film itself is an object where vibration is to be detected, the thickness of the vibration sensor film, the vibration actuator film, and the vibration reduction film is reduced.

BRIEF DESCRIPTION OF THE DRAWINGS

For more complete understanding of the present invention, and the advantage thereof, reference is now made to the following descriptions taken in conjunction with the accompanying drawings, in which:

FIG. 4 is an explanatory view of a vibration sensor system according to a modification example of the first embodiment;

FIG. 6 is an explanatory view showing the structure of a vibration reduction system according to a third embodiment;

DESCRIPTION OF THE PREFERRED EMBODIMENTS

First Embodiment

Figure 1:
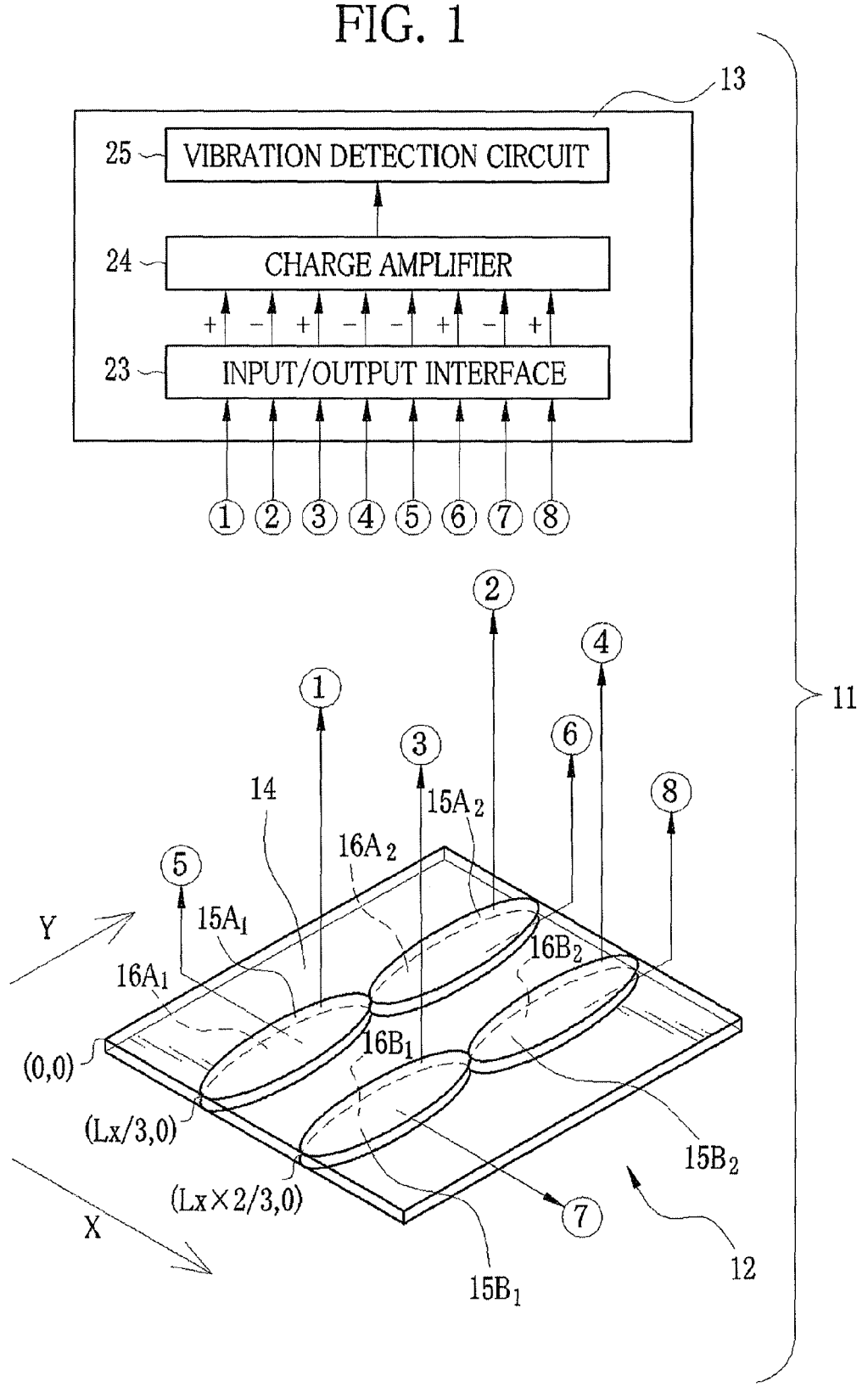
FIG. 1 is an explanatory view showing the structure of a vibration sensor system according to a first embodiment.

As shown in FIG. 1, a vibration sensor system 11 is constituted of a vibration sensor film 12 and a control unit 13. The vibration sensor system 11 is a system to detect vibration applied to the vibration sensor film 12. The vibration sensor film 12 is used as, for example, a building component being apart of a window or a partition. The vibration sensor film 12 is constituted of a piezoelectric polymer film 14 and electrodes (sensor electrodes) 15A, 15B, 16A, and 16B.

It is preferable that the vibration sensor film 12 be made of an organic piezoelectric material or an organic-inorganic hybrid piezoelectric material, instead of an inorganic material that is used in a conventional piezoelectric sensor and is too brittle to upsize, in consideration of a use as a plane or curved large panel, e.g. the building component for the window. From this standpoint, the piezoelectric polymer film 14 according to this embodiment is made of polyvinylidene fluoride (PVDF), but a material for the piezoelectric polymer film 14 is not limited to it. The piezoelectric polymer film 14 may be made of any piezoelectric resin such as a polylactic resin or a cellulose derivative resin. The piezoelectric polymer film 14 is in a plate shape, and has a rectangular outline. The whole circumference of the piezoelectric polymer film 14 is supported (secured) by a support frame 17 at four sides (refer to FIG. 2). This support frame 17 simply supports the piezoelectric polymer film 14 with a knife-edged catch portion 17a or a line contact support that linearly makes contact with the four sides of the circumference of the piezoelectric polymer film 14. FIG. 1 omits illustration of the support frame 17.

The vibration sensor film 12 may be in any shape such as a square, a round, and a cantilever instead of the rectangle, and be supported by any manner instead of the simple support.

The vibration sensor system 11 detects the vibration applied to the piezoelectric polymer film 14. In other words, upon vibration of the piezoelectric polymer film 14, voltages depending on the vibration are outputted from the electrodes 15A, 15B, 16A, and 16B. The present invention is not limited to above, and the support frame 17 may be fixed on a vibrating object so that the piezoelectric polymer film 14 is in parallel with the object to be detected. In this case, since the same vibration is applied to the piezoelectric polymer film 14, the vibration sensor system 11 can detect the vibration applied to the object.

Figure 2:
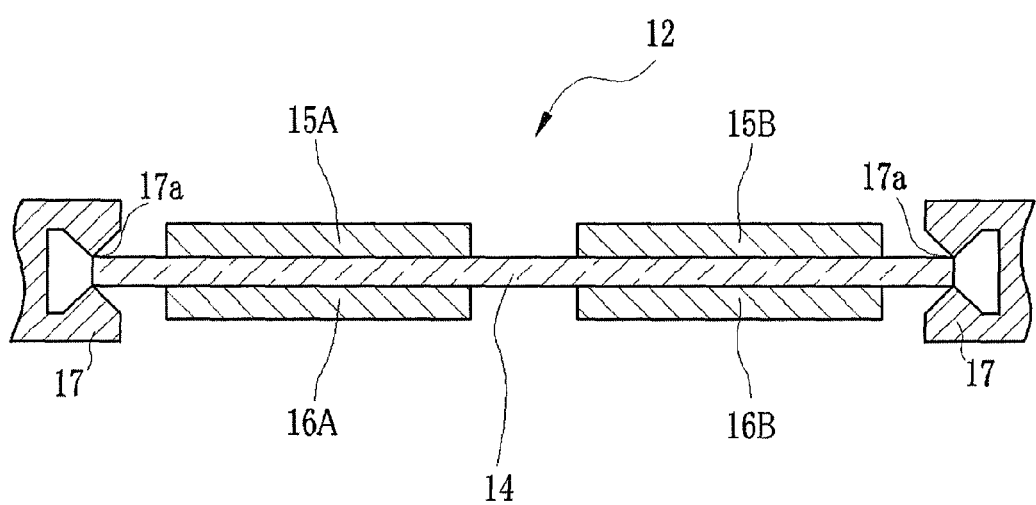
FIG. 2 is a cross-sectional view of a vibration sensor film taken along an X direction according to the first embodiment.

The electrodes 15A and 15B, as shown in FIG. 2, are disposed on a front surface of the piezoelectric polymer film 14. The electrodes 16A and 16B are disposed on a rear surface of the piezoelectric polymer film 14. The electrodes 15A, 15B, 16A, and 16B have the same shape. The electrode 15A is opposed to the electrode 16A across the piezoelectric polymer film 14, and the electrode 15B is opposed to the electrode 16B across the piezoelectric polymer film 14. These electrodes 15A, 15B, 16A, and 16B are formed by an electrode patterning process described later into a pattern based on a particular mode of vibration occurring in the piezoelectric polymer film 14.

The electrodes 15A, 15B, 16A, and 16B are preferably made of aluminum in terms of productive efficiency and suitability for development, but may be made of any metal such as copper or silver as long as the metal has developability and enables application of voltage. Otherwise, the electrodes may be made of a conductive polymeric material. In this case, a protective layer removing agent that is a poor solvent of the piezoelectric resin and a good solvent of the conductive polymeric material is used in a development step described later on. As the conductive polymeric material, PEDOT-PSS (conductive polythiophene polymer) is preferable, but any polymeric material is available as long as voltage is applied to the piezoelectric polymer film 14 therethrough.

Figure 3A:
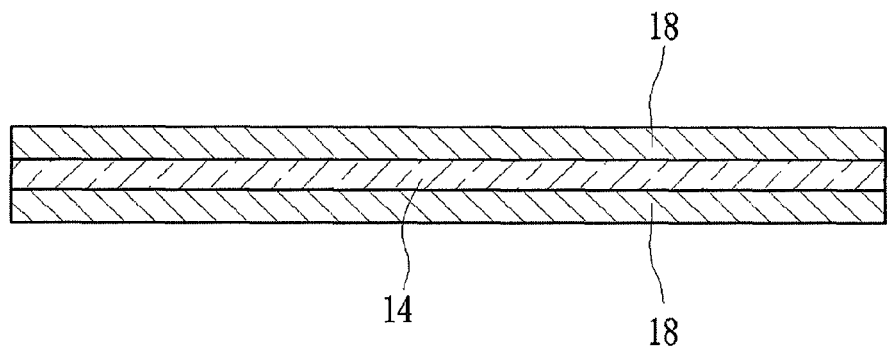
FIGS. 3A to 3F are explanatory views of an electrode patterning process for forming an electrode layer on a piezoelectric polymer film.

The electrodes 15A, 15B, 16A, and 16B are formed in the vibration sensor film 12 by the following electrode patterning process. First, aluminum electrode layers 18 are formed on both surfaces of the piezoelectric polymer film 14 by, for example, vacuum evaporation. FIG. 3A shows a state where the aluminum electrode layers 18 are formed on the piezoelectric polymer film 14. There is a commercially available PVDF to be usable as the piezoelectric polymer film 14 in which aluminum electrodes are formed on the whole surfaces of the PVDF by vacuum evaporation and polarized. Using this PVDF obviates the necessity to form the aluminum electrode layers 18.

Figure 3B:
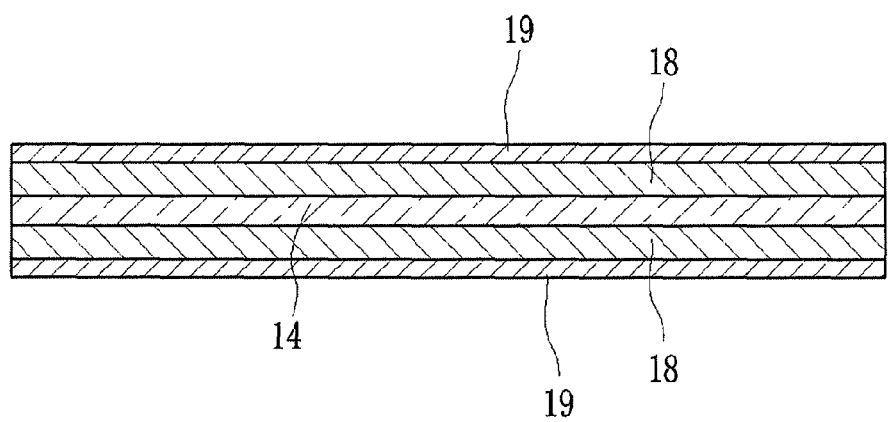

Then, photoresist layers 19 are formed on the aluminum electrode layers 18 (FIG. 3B). The photoresist layer 19 is made of either a general negative photoresist material or a general positive photoresist material. As a method for applying the photoresist material, roll coating, spin coating, dipping, spraying or the like is available. Among these methods, the roll coating is especially preferable in terms of productivity.

Figure 3C:
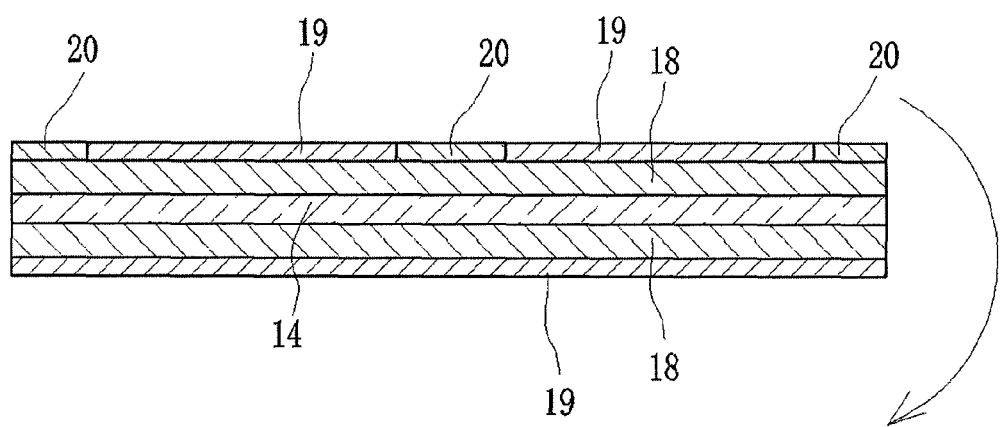
Figure 3D:
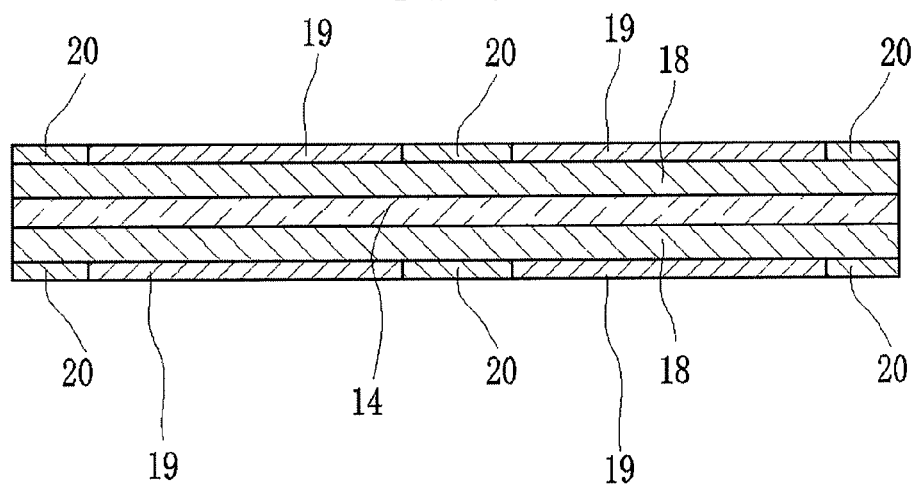

If the positive photoresist material has been applied to form the photoresist layer 19, a photomask that shields areas to be left as the electrodes 15A, 15B, 16A, and 16B is overlaid on the photoresist layer 19, and light is applied to the photoresist layer 19 through the photomask (FIG. 3C). Thus, as shown in FIG. 3C, exposed areas 20 of the photoresist layer 19 become soluble in a developing solution, whereas unexposed areas are not soluble therein. After that, the piezoelectric polymer film 14 is turned upside down, and the photoresist layer 19 of the other side is exposed to the light in a like manner (FIG. 3D).

Figure 3E:
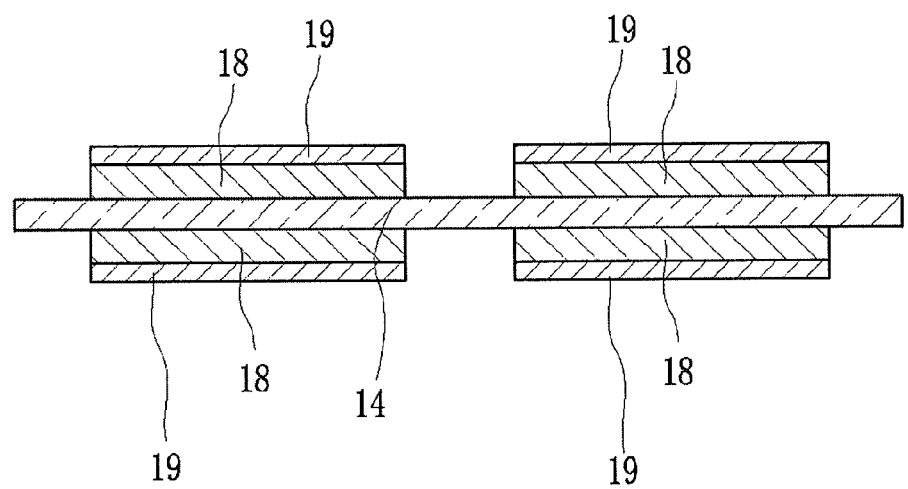
Figure 3F:
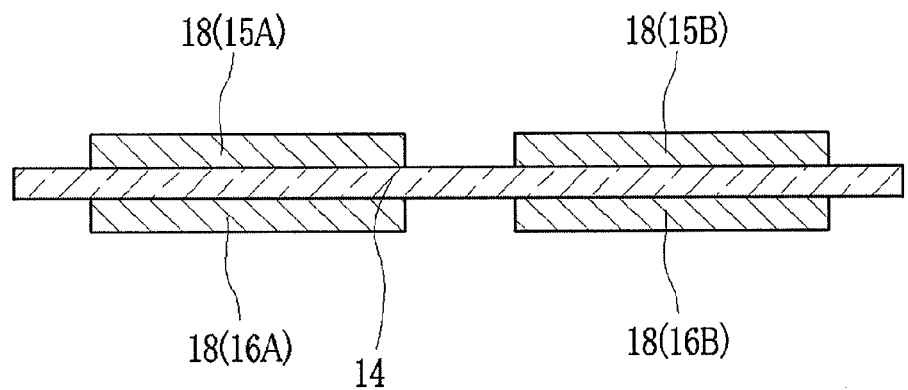

After the exposure, the photoresist layer 19 is developed in the developing solution such as an alkaline solution. The exposed areas 20 of the photoresist layer 19 are dissolved, and then the bare aluminum electrode layers 18 under the exposed areas 20 are dissolved (FIG. 3E). After that, the photoresist layer 19 is removed by a poor solvent of the piezoelectric polymer film 14 (FIG. 3F). Accordingly, the electrodes 15A, 15B, 16A, and 16B are patterned on the both surfaces of the piezoelectric polymer film 14.

To remove the aluminum electrode layer 18 under the exposed area 20, development with the alkaline solution is preferably used, but another method such as development with an acid solution is available as long as the aluminum electrode layer 18 is dissolved thereby. It is preferable that the thickness of the photoresist layer 19 be 5 µm or less in view of development speed, but the thickness of the photoresist layer 19 is not limited to it as long as the photoresist layer 19 can protect the aluminum electrode layer 18 and be developable. Ultraviolet irradiation using the photomask is preferable as an exposure method of the photoresist layer 19, and an exposure amount is preferable at 0.1 to 1.0 J. The alkaline solution is preferable as the developing solution in view of electrode removability, but any solution is available as long as it can dissolve both of the photoresist layer 19 and the aluminum electrode layer 18. A photoresist layer removing agent used after the dissolution of the aluminum electrode layer 18 is not especially limited as long as the agent is a poor solvent of the piezoelectric polymer film 14. There is, for example, methanol, ethanol, acetone, MEK or the like as the photoresist layer removing agent. Instead of the agent, an adhesive tape may be used for the removal of the photoresist layer 19 as long as the adhesive tape does not remove the electrodes 15A, 15B, 16A, and 16B.

The electrode patterning process is not limited to above, and may not include the development step. In this case, it is preferable that the electrodes 15A, 15B, 16A, and 16B be made of the conductive polymeric material from the viewpoint of productivity including suitability for application, and any dissolved metal material including silver paste is available as long as the metal material can be applied to the piezoelectric polymer film 14 and enable application of voltage. A solvent having a low boiling point such as methanol, ethanol, and MEK is preferably used as an application liquid, but any solvent is available as long as the solvent is a poor solvent of the piezoelectric polymer film 14 being a base material.

The electrodes may be formed on the piezoelectric polymer film 14 by general patterning technique such as ink-jetting or printing. In this case, as an application liquid for forming the electrode layer, there is available a general conductive material such as conductive polymeric material PEDOT or silver paste. A solvent is not especially limited as long as the solvent is a poor solvent of the piezoelectric polymer film 14, and MEK, toluene, methanol or the like is preferable from the viewpoint of productivity. It is preferable that drying temperature after the application be 90° C. or less, but the drying temperature is not especially limited as long as it is "Tg" (glass transition temperature) of a piezoelectric polymer material or less. It is preferable that the thickness of the electrode layer be 5 μm or less, but the thickness thereof is not especially limited as long as voltage is applicable thereto. The electrodes have to be formed on both surfaces of the piezoelectric polymer film 14 so as to be opposed to each other across the piezoelectric polymer film 14.

Here is a concrete method for forming the electrodes: (1) applying a conductive material (for example, silver paste or PEDOT) by ink-jetting to both surfaces of a piezoelectric polymer film fed by a roll feeder, by which the piezoelectric polymer film is pulled out of a roll and wound around another roll, or a batch feeder, (2) drying the conductive material to form electrode films, and (3) applying high voltage to each electrode portion for polarization to generate piezoelectricity only in the electrode portions.

The electrodes 15A, 15B, 16A, and 16B are formed on the piezoelectric polymer film 14 by the above process in positions and shapes based on a particular mode of vibration applied to the piezoelectric polymer film. A pattern of the electrodes 15A, 15B, 16A, and 16B will be hereinafter described. The piezoelectric polymer film 14, as described above, is simply supported at four sides. Accordingly, when an X direction refers to a direction along short sides and a Y direction refers to a direction along long sides (refer to FIG. 1), the superposition of first-order vibration, second-order vibration, third-order vibration, and the like appears in each of the X and Y directions. Among the vibration of the piezoelectric polymer film 14, there will be described the cases of detecting (1st, 2nd)-order vibration (the first-order vibration appears in the X direction and the second-order vibration appears in the Y direction, the same applies below) and (2nd, 2nd)-order vibration.

In the (1st, 2nd)-order vibration, an X-directional stationary wave has a single peak, and a Y-directional stationary wave has two peaks. In the (2nd, 2nd)-order vibration, the X-directional stationary wave has two peaks, and the Y-directional stationary wave has the two peaks. Thus, in the case of detecting the (1st, 2nd)-order vibration and the (2nd, 2nd)-order vibration, as shown in FIG. 1, the electrodes are formed from coordinates (Lx/3, 0) and (Lx×⅔, 0) on an X axis into a pattern that satisfies a function $F(y)=\pm A \times \sin(2 \times \pi \times y/Ly)$ (the electrodes are in areas surrounded by curves of the function). Where "Lx" represents the length of the vibration sensor film 12 in the X direction, "Ly" represents the length thereof in the Y direction, and an origin point (0, 0) coincides with a left corner of the vibration sensor film 12. In the function F(y), "A" is a constant that depends on conditions including the thickness and the material of the vibration sensor film 12. Based on this function F(y), the electrodes 15A, 15B, 16A, and 16B are formed into the pattern corresponding to the particular mode of vibration, in other words, the pattern in which the number of peaks of a sine curve projecting in the X direction coincides with the number of peaks of the detected vibration (order of the vibration, two in this case). As shown in FIG. 1, a reference number 15A refers to the electrode formed on the front surface of the vibration sensor film 12 from the coordinates (Lx/3, 0) along the Y direction, and a reference number 16A refers to the electrode formed on the rear surface of the vibration sensor film 12 in a like manner. A reference number 15B refers to the electrode formed on the front surface of the vibration sensor film 12 from the coordinates (Lx×⅔, 0) along the Y direction, and a reference number 16B refers to the electrode formed on the rear surface of the vibration sensor film 12 in a like manner.

As shown in FIG. 1, outputs are separately taken out of eight electrode portions 15A$_1$, 15A$_2$, 15B$_1$, 15B$_2$, 16A$_1$, 16A$_2$, 16B$_1$, and 16B$_2$, into which individual electrodes 15A, 15B, 16A, and 16B are divided by nodes of vibration. FIG. 1 shows the case of detecting the (1st, 2nd)-order vibration.

The control unit 13, as shown in FIG. 1, is constituted of an input/output interface 23, a charge amplifier 24, a vibration detection circuit 25, and the like. The input/output interface 23 is connected to the electrodes 15A, 15B, 16A, and 16B. Electric charge signals outputted from each of the eight electrode portions 15A$_1$, 15A$_2$, 15B$_1$, 15B$_2$, 16A$_1$, 16A$_2$, 16B$_1$, and 16B$_2$ are inputted to the charge amplifier 24 through the input/output interface 23. At this time, the electric charge signals from the electrode portions 15A$_1$ and 15A$_2$, or 15B$_1$ and 15B$_2$ that are adjacent in the Y direction are inputted to opposite polarities to each other. The electric charge signals from the electrode portions 15A$_1$ and 15B$_1$, or 15A$_2$ and 15B$_2$ that are adjacent in the X direction are inputted to the same polarity as each other. The electric charge signals from the electrode portions 15A$_1$ and 16A$_1$, 15A$_2$ and 16A$_2$, 15B$_1$ and 16B$_1$, or 15B$_2$ and 16B$_2$ that face across the piezoelectric polymer film 14 are inputted to the opposite polarities to each other. In other words, if the electric charge signals from the electrode portions 15A$_1$ and 15B$_1$ are inputted to the positive pole of the charge amplifier 24, the electric charge signals from the electrode portions 15A$_2$ and 15B$_2$ are inputted to the negative pole thereof. The electric charge signals from the electrode portions 16A$_1$ and 16B$_1$ are inputted to the negative pole of the charge amplifier 24, and the electric charge signals from the electrode portions 16A$_2$ and 16B$_2$ are inputted to the positive pole. Accordingly, the sum of the electric charge signals by the (1st, 2nd)-order vibration is inputted to the charge amplifier 24.

The charge amplifier 24 amplifies and integrates the inputted electric charge signals. Thus, the charge amplifier 24 produces an output voltage based on the inputted electric charge signals.

The vibration detection circuit 25 detects the (1st, 2nd)-order vibration of the piezoelectric polymer film 14 from the output voltage produced by the charge amplifier 24. Since the electrodes 15 and 16 are formed into the pattern corresponding to the particular mode of vibration, as described above, it is possible to detect the particular mode of vibration with high accuracy. In addition, since the electrodes 15A, 15B, 16A, and 16B are patterned in surfaces of the piezoelectric polymer film 14, eliminating the necessity of a base material such as a support plate is effective in reduction in the thickness of the vibration sensor film 12.

In the case of detecting the (2nd, 2nd)-order vibration by the above vibration sensor film 12, it is necessary to change the polarity into which the electric charge signals are to be inputted in accordance with a vibration mode. In this case, the electric charge signals from the electrodes 15A and 15B are inputted to the opposite polarities to each other, and the electric charge signals from the electrodes 16A and 16B are inputted to the opposite polarities to each other. More specifically, if outputs from the electrode portions $15A_1$, $15B_2$, $16A_2$, and $16B_1$ are inputted to the positive pole of the charge amplifier 24, outputs from the electrode portions $15A_2$, $15B_1$, $16A_1$, and $16B_2$ are inputted to the negative pole thereof. Thus, the sum of the electric charge signals by the (2nd, 2nd)-order vibration is inputted to the charge amplifier 24. Except for the input polarities mentioned above, the structure of a vibration sensor system is the same as that of FIG. 1.

The electrodes, as described above, are formed into a pattern of a sine function in accordance with the order of vibration to be detected. Taking the case of detecting (1st, 3rd)-order vibration and (2nd, 3rd)-order vibration as an example, the electrodes are formed into a pattern based on a function $\pm F(y)=A\times\sin(3\times\pi\times y/Ly)$, and have three peaks of a sine curve along the Y direction. FIG. 4 shows a modification example of the first embodiment of FIG. 1. In FIG. 4, a vibration sensor film 12 has electrodes 21A, 21B, 22A, and 22B for detecting the (1st, 3rd)-order vibration. The structure of the vibration sensor film 12 of FIG. 4 is the same as that of FIG. 1 according to the first embodiment, except for the pattern of the electrodes 21 and 22. In this case, outputs are separately taken out of twelve electrode portions $21A_1$, $21A_2$, $21A_3$, $21B_1$, $21B_2$, $21B_3$, $22A_1$, $22A_2$, $22A_3$, $22B_1$, $22B_2$, and $22B_3$ into which individual electrodes 21A, 21B, 22A, and 22B are divided by nodes of vibration. As with FIG. 1, an electric charge signal from each electrode portion is inputted to an appropriate polarity of a charge amplifier 24 in accordance with a mode of vibration to be detected, so that the sum of the electric charge signals by the (1st, 3rd)-order vibration is inputted to the charge amplifier 24. The charge amplifier 24 amplifies and integrates the sum of the electric charge signals to produce an output voltage. The output voltage is detected as an output value of the (1st, 3rd)-order vibration. In the case of detecting the (2nd, 3rd)-order vibration, the electric charge signal from each of the electrode portions $21B_1$, $21B_2$, $21B_3$, $22B_1$, $22B_2$, and $22B_3$ is inputted to the opposite polarity to that of FIG. 4 of the charge amplifier 24. Thus, the sum of the electric charge signals by the (2nd, 3rd)-order vibration is inputted to the charge amplifier 24.

Second Embodiment

Figure 5:
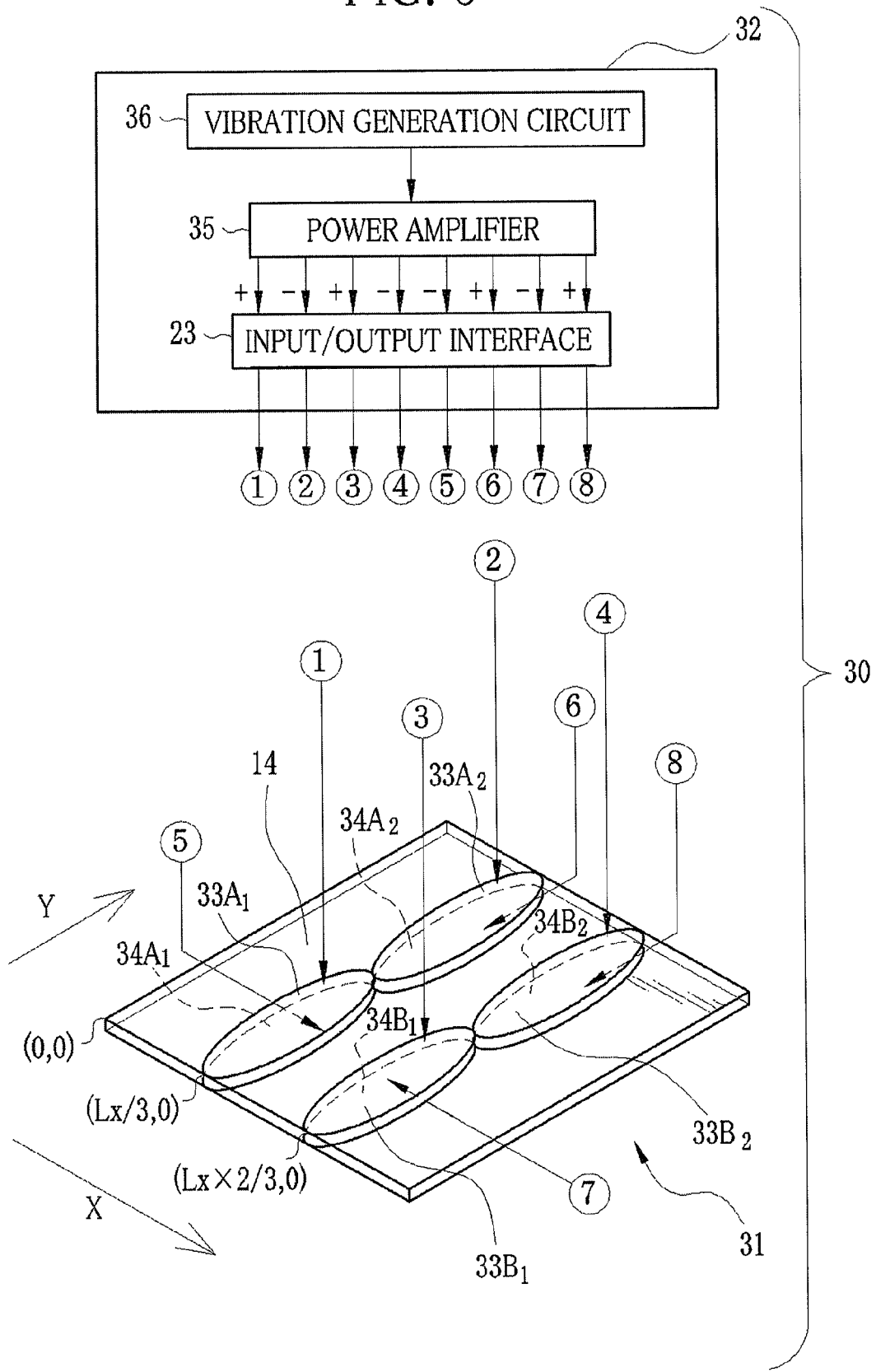
FIG. 5 is an explanatory view showing the structure of a vibration generator system according to a second embodiment.

In the first embodiment, the piezoelectric polymer film 14 and the electrodes 15A, 15B, 16A, and 16B, or 21A, 21B, 22A, and 22B patterned on the piezoelectric polymer film 14 compose the vibration sensor film 12. However, the vibration sensor film 12 is also available as a vibration actuator film. FIG. 5 shows a vibration generator system 30 that is provided with this vibration actuator film. The vibration generator system 30 is constituted of a vibration actuator film 31 and a control unit 32. The vibration actuator film 31 has the same structure as the vibration sensor film 12 according to the first embodiment, and is constituted of a piezoelectric polymer film 14 and electrodes (drive electrodes) 33A, 33B, 34A, and 34B. The pattern of the electrodes 33A, 33B, 34A, and 34B is the same as that of the electrodes 15A, 15B, 16A, and 16B. The vibration generator system 30 of FIG. 5 generates (1st, 2nd)-order vibration by applying voltages to the electrodes 33A, 33B, 34A, and 34B.

The control unit 32 is constituted of an input/output interface 23, a power amplifier 35, a vibration generation circuit 36, and the like. The input/output interface 23 is connected to electrode portions $33A_1$, $33A_2$, $33B_1$, $33B_2$, $34A_1$, $34A_2$, $34B_1$, and $34B_2$ into which the electrodes 33A, 33B, 34A, and 34B are divided by nodes of vibration. In the control unit 32, the power amplifier 35 amplifies a signal from the vibration generation circuit 36, and outputs voltages. The voltages are inputted to the electrode portions $33A_1$, $33A_2$, $33B_1$, $33B_2$, $34A_1$, $34A_2$, $34B_1$, and $34B_2$ through the input/output interface 23, so that the voltages are applied to the piezoelectric polymer film 14. Applying the voltage with an appropriate polarity to each of the electrode portions $33A_1$, $33A_2$, $33B_1$, $33B_2$, $34A_1$, $34A_2$, $34B_1$, and $34B_2$ causes generation of the (1st, 2nd)-order vibration. The application of the voltage from the control unit 32 to the electrodes 33A, 33B, 34A, and 34B displaces and bends the piezoelectric polymer film 14 so as to generate the vibration in the vibration actuator film 31. Furthermore, when a vibration is applied to the piezoelectric polymer film 14 by external force, if another vibration the phase of which is opposite to that of the externally applied vibration is generated, the generated vibration counteracts the externally applied vibration, and thus restrains a particular mode of vibration. According to the second embodiment, as with the first embodiment, since the electrodes 33A, 33B, 34A, and 34B are patterned in the surfaces of the piezoelectric polymer film 14, eliminating the necessity of a base material such as a support plate is effective in reduction in the thickness of the vibration actuator film 31.

FIG. 5 shows the case of generating the (1st, 2nd)-order vibration. In the case of generating the (2nd, 2nd)-order vibration, the polarity of the voltage applied to each of the electrode portions $33B_1$, $33B_2$, $34B_1$, and $34B_2$ is set oppositely to FIG. 5.

Third Embodiment

Figure 7:
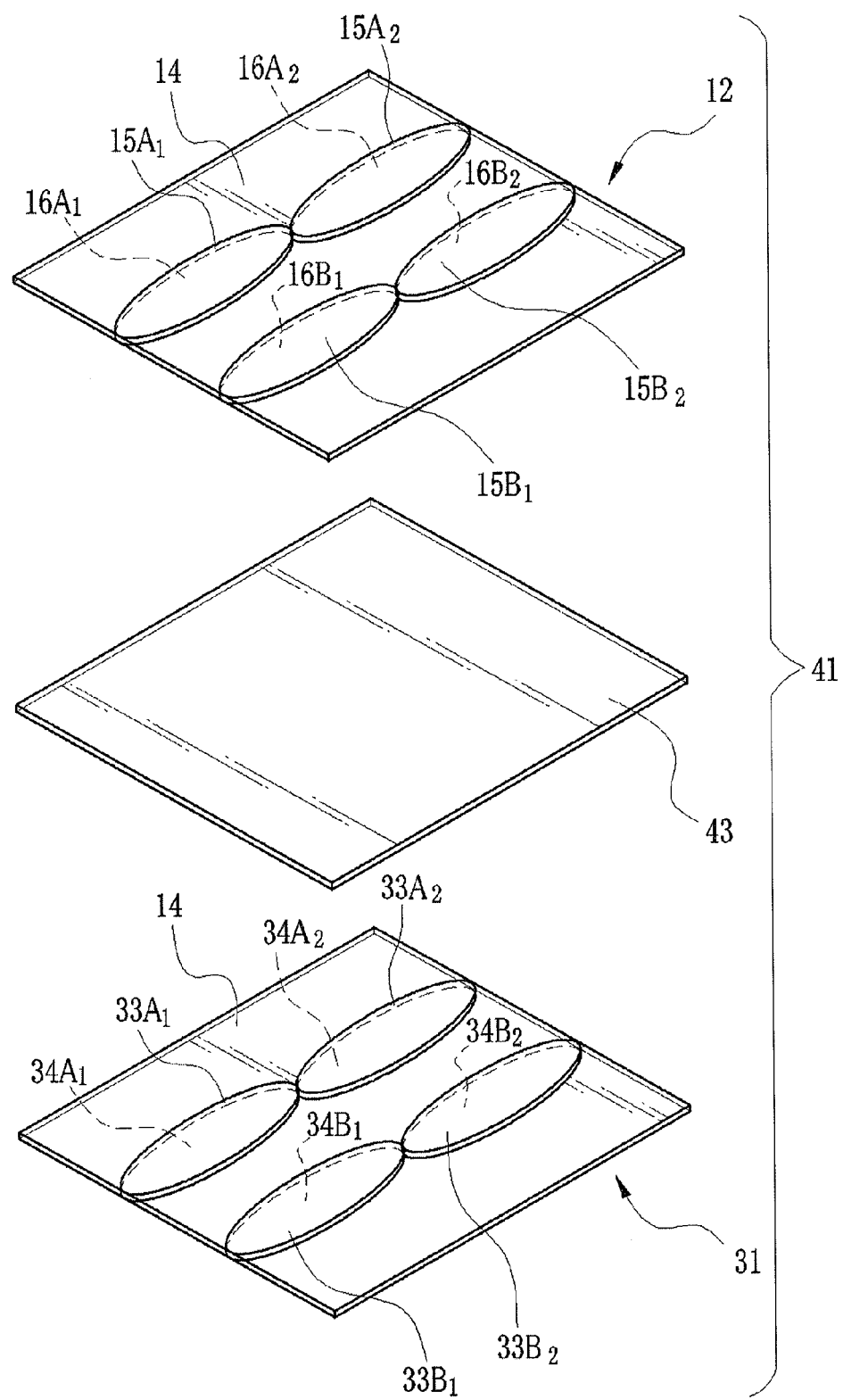
FIG. 7 is an exploded perspective view of a vibration reduction film according to the third embodiment.

A vibration reduction film that is composed of a combination of the vibration sensor film according to the first embodiment and the vibration actuator film according to the second embodiment will be described. In this vibration reduction film, the vibration sensor film detects a particular mode of vibration, and the vibration actuator film generates a canceling vibration for counteracting the detected vibration so as to reduce vibration occurring in piezoelectric polymer films. FIGS. 6 and 7 show a vibration reduction system 40 having this vibration reduction film. The vibration reduction system 40 has a vibration reduction film 41 and a control unit 42. The vibration reduction film 41 is constituted of a vibration sensor film 12 having the same structure as that of the first embodiment, a vibration actuator film 31 having the same structure as that of the second embodiment, and an insulting layer 43 sandwiched between the vibration sensor film 12 and the vibration actuator film 31. The vibration sensor film 12, the insulating layer 43, and the vibration actuator film 31 are glued to one another, and stacked in three layers. All of the vibration sensor film 12, the vibration actuator film 31, and the insulating layer 43 have the same outside shape. Electrodes 15A and 16A of the vibration sensor film 12 overlap with electrodes 33A and 34A of the vibration actuator film 31, and electrodes 15B and 16B of the vibration sensor film 12 overlap with electrodes 33B and 34B of the vibration actuator film 31. The insulating layer 43 may be a polyimide film such as Kapton, or a general-purpose resin film such as a polyester film. A material for the insulating layer 43 is not limited to above as long as the material has insulation properties. Adhesive layers that are formed on the surfaces of the insulating layer 43 for adhesion to the vibration sensor film 12 and the vibration actuator film 31 are made of an insulative material such as an acrylic adhesive.

The control unit 42 is constituted of an input/output interface 23, a charge amplifier 24, a vibration detection circuit 25, a power amplifier 35, a vibration generation circuit 36, and the like. The input/output interface 23 is connected to the electrodes 15A, 15B, 16A, 16B, 33A, 33B, 34A, and 34B. In FIG. 7, connections between the input/output interface 23 and each of the electrodes 15A, 15B, 16A, 16B, 33A, 33B, 34A, and 34B are omitted for the sake of simplicity. However, in reality, each individual electrode portion is connected to the input/output interface 23, as with the first and second embodiments, and is connected to the charge amplifier 24 and the power amplifier 35 with the same polarity as the first and second embodiments.

In this control unit 42, the charge amplifier 24 first amplifies electric charge signals from the electrodes 15A, 15B, 16A, and 16B, and produces an output voltage. The vibration detection circuit 25 detects a particular mode of vibration applied to the vibration sensor film 12 from the output voltage. The vibration generation circuit 36 inputs a signal to the power amplifier 35 to counteract the detected vibration. The power amplifier 35 amplifies the signal, and voltages are applied to the electrodes 33A, 33B, 34A, and 34B through the input/output interface 23. The application of the voltages to the electrodes 33A, 33B, 34A, and 34B causes generation of a cancelling vibration of opposite phase in the vibration reduction film 41. The control unit 42 reduces the vibration occurring in piezoelectric polymer films 14 by feedback control. As described above, since the electrodes 15A, 15B, 16A, 16B, 33A, 33B, 34A, and 34B are formed into a pattern based on the particular mode of vibration, it is possible to accurately detect the particular mode of vibration and certainly counteract the detected vibration. According to the third embodiment, as with the first and second embodiments, since the electrodes 15A, 15B, 16A, 16B, 33A, 33B, 34A, and 34B are patterned in the surfaces of the piezoelectric polymer films 14, eliminating the necessity of a base material such as a support plate is effective in reduction in the thickness of the vibration reduction film 41.

In the third embodiment, the vibration sensor film 12 and the vibration actuator film 31 are stacked to form the vibration reduction film 41. However, in vibration reduction films 44A and 44B of FIGS. 8 and 9, comb-shaped sensor electrodes 45 and comb-shaped drive electrodes 46 are formed on the same surface (front surface) of a single piezoelectric polymer film 14. The sensor electrodes 45 and the drive electrodes 46 are similarly formed on a rear surface of the piezoelectric polymer film 14, though they are not illustrated in FIGS. 8 and 9. The sensor electrodes 45 output detection voltages, as with the electrodes 15A, 15B, 16A, and 16B. To the drive electrodes 46, drive voltages are applied as with the electrodes 33A, 33B, 34A, and 34B. The sensor electrodes 45 and the drive electrodes 46 are formed into a comb shape so that teeth of the sensor electrode 45 and teeth of the drive electrode 46 are engaged with one another. The engagement of the sensor electrodes 45 and the drive electrodes 46 has the same pattern as that of the electrodes according to the first and second embodiments. Therefore, since the sensor electrode 45 for detecting a particular mode of vibration is adjacent to the drive electrode 46 for generating a cancelling vibration, it is possible to drive the vibration reduction film 44A or 44B with high accuracy. Since the sensor electrodes 45 and the drive electrodes 46 are patterned in the same surface of the piezoelectric polymer film 14, the thickness of the vibration reduction film 44A or 44B is further reduced.

Figure 8:
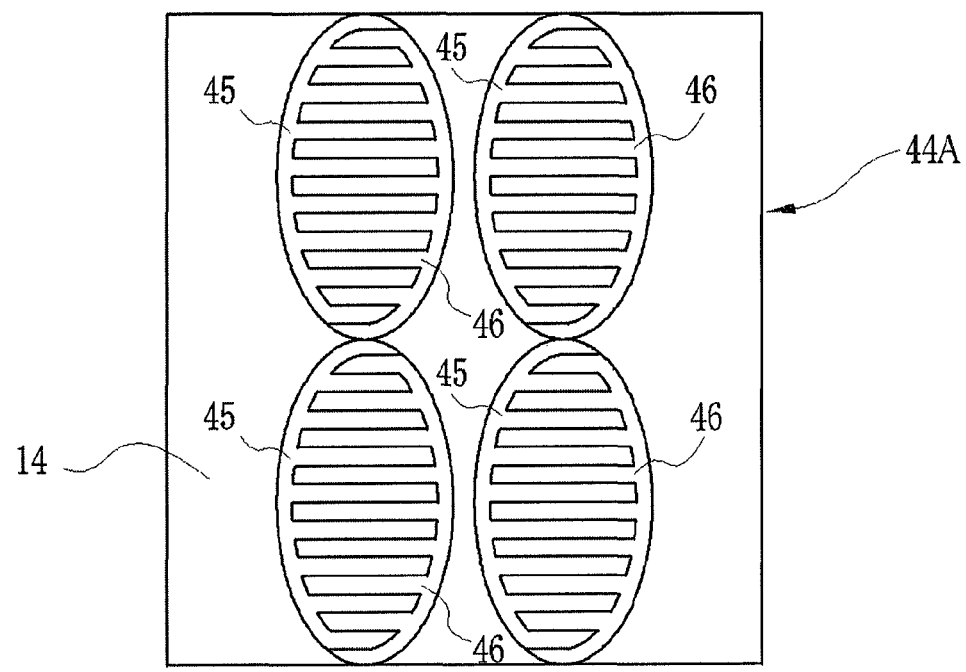
FIG. 8 is a top plan view of a vibration reduction film according to a first modification example of the third embodiment.
Figure 9:
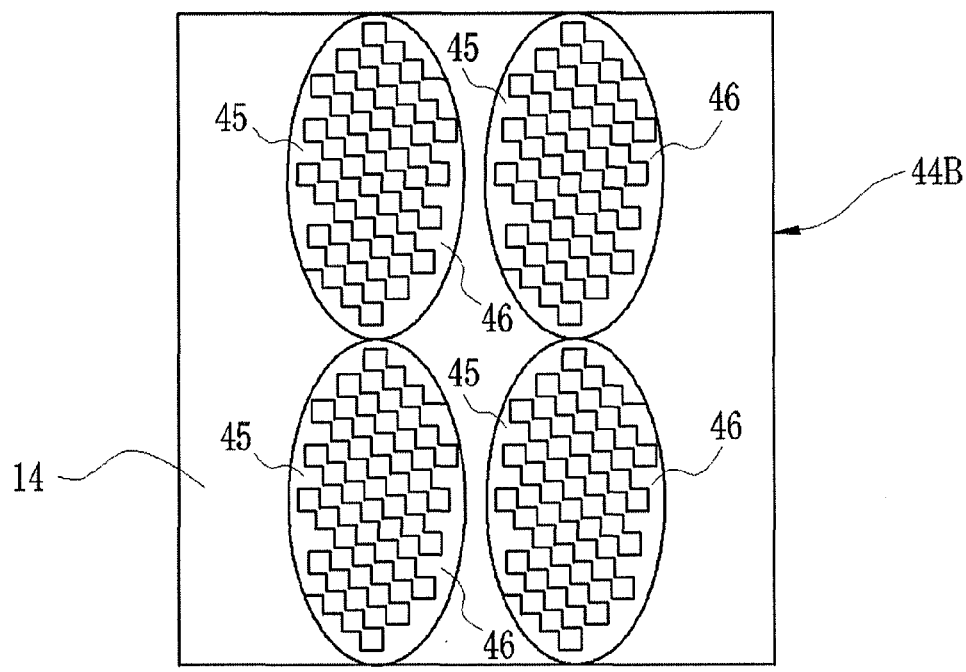
FIG. 9 is a top plan view of a vibration reduction film according to a second modification example of the third embodiment.

Especially in the vibration reduction film 44B shown in FIG. 9, the sensor electrodes 45 and the drive electrodes 46 are formed into a comb shape having serrate teeth in which a plurality of rectangles is diagonally connected. The teeth of the sensor electrode 45 and the teeth of the drive electrode 46 are engaged with one another, and the engagement of the sensor electrodes 45 and the drive electrodes 46 are in the same pattern as that of the electrodes according to the first and second embodiments. The sensor electrode 45 for detecting a particular mode of vibration is adjacent to the drive electrode 46 for generating a cancelling vibration, the same effect as FIG. 8 is obtained.

Note that the term of engaging shapes herein, for example comb shapes, is used for staggered shapes of two complementary profiles, which have numerous protruding and retreating portions, correspond to one another in a manner of fitting one protruding portion of a first profile in one retreating portion of a second of those, and are combined together entirely in a single relationship on a plane surface.

Fourth Embodiment

Figure 10:
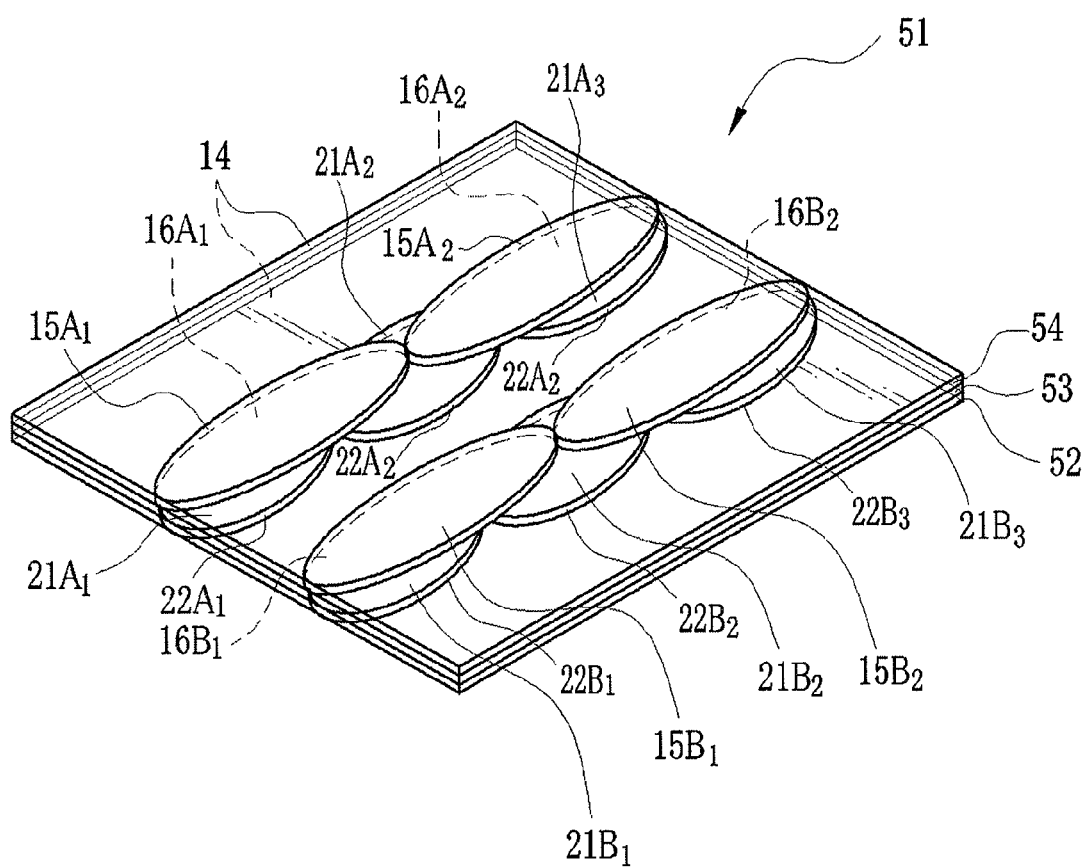
FIG. 10 is a perspective view of a multilayer vibration sensor film according to a fourth embodiment.
Figure 11:
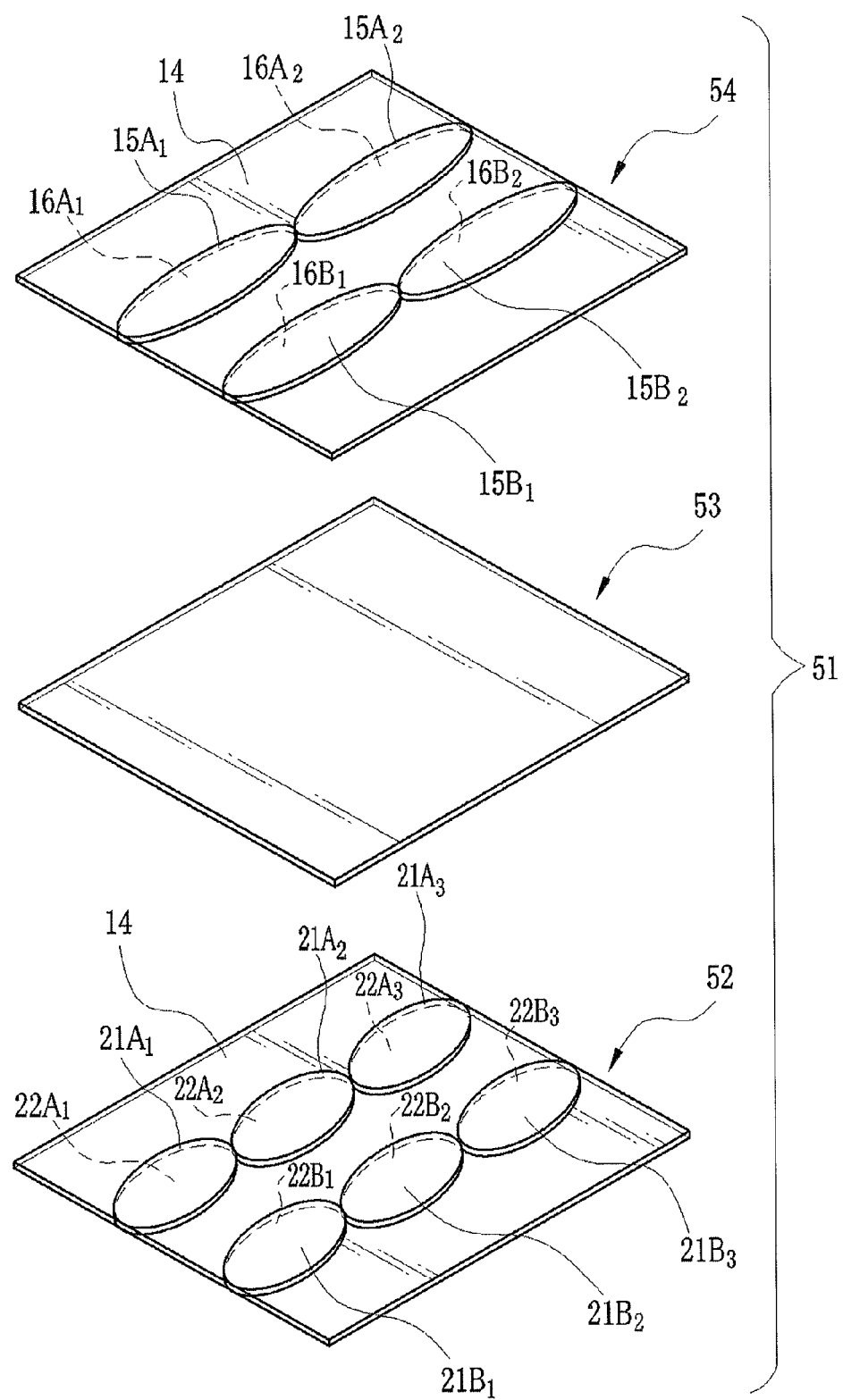
FIG. 11 is an exploded perspective view of the multilayer vibration sensor film according to the fourth embodiment.

The vibration sensor film 12 of the first embodiment detects the single particular mode of vibration, and the vibration actuator film 31 of the second embodiment generates the single particular mode of vibration. In a fourth embodiment, a multilayer vibration sensor film for detecting a plurality of modes of vibration and a multilayer vibration actuator film for generating a plurality of modes of vibration will be described. A multilayer vibration sensor film 51 shown in FIGS. 10 and 11 is constituted of a first vibration sensor film 54 for detecting (1st, 2nd)-order vibration or (2nd, 2nd)-order vibration, a second vibration sensor film 52 for detecting (1st, 3rd)-order vibration or (2nd, 3rd)-order vibration, and an insulating layer 53 sandwiched between the first vibration sensor film 54 and the second vibration sensor film 52. The first vibration sensor film 54 has electrodes $15A_1$, $15A_2$, $15B_1$, and $15B_2$ on a front surface, and electrodes $16A_1$, $16A_2$, $16B_1$, and $16B_2$ on a rear surface. The second vibration sensor film 52 has electrodes $21A_1$, $21A_2$, $21A_3$, $21B_1$, $21B_2$, and $21B_3$ on a front surface, and electrodes $22A_1$, $22A_2$, $22A_3$, $22B_1$, $22B_2$, and $22B_3$ on a rear surface. The first vibration sensor film 54, the insulating layer 53, and the second vibration sensor film 52 are glued to one another, and stacked in three layers. All of the first vibration sensor film 54, the second vibration sensor film 52, and the insulating layer 53 have the same outside shape. The electrodes 15A and 16A of the first vibration sensor film 54 partly overlap with the electrodes 21A and 22A of the second vibration sensor film 52. The electrodes 15B and 16B of the first vibration sensor film 54 partly overlap with the electrodes 21B and 22B of the second vibration sensor film 52. This multilayer vibration sensor film 51 is connected to a control unit 13, which is similar to the control unit 13 according to the first embodiment. The insulating layer 53 has similar structure to the insulating layer 43 of the third embodiment.

The electrodes 15A, 15B, 16A, and 16B are formed into a pattern based on the (1st, 2nd)-order and (2nd, 2nd)-order vibration, and the electrodes 21A, 21B, 22A, and 22B are formed into a pattern based on the (1st, 3rd)-order and (2nd, 3rd)-order vibration. Accordingly, the (1st, 2nd)-order vibration or the (2nd, 2nd)-order vibration is detected from electric charge signals outputted from the electrodes 15A, 15B, 16A, and 16B, and the (1st, 3rd)-order vibration or the (2nd, 3rd)-order vibration is detected from electric charge signals outputted from the electrodes 21A, 21B, 22A, and 22B. Furthermore, if three or more types of vibration sensor films that have electrodes formed into different patterns are stacked via insulating layers, three or more modes of vibration can be detected.

The multilayer vibration actuator film for generating a plurality of modes of vibration has the same structure as the multilayer vibration sensor film 51 of FIGS. 10 and 11. To manufacture a multilayer vibration reduction film that detects a plurality of modes of vibration and is driven to counteract the vibration, the vibration reduction film 44A or 44B shown in FIG. 8 or 9 in which both of the sensor electrodes 45 and the drive electrodes 46 are patterned on the single piezoelectric polymer film 14 is usable. A plurality of vibration reduction films 44A or 44B corresponding to different vibration modes may be stacked via an insulating layer or insulating layers.

Fifth Embodiment

In the first embodiment, the rectangular piezoelectric polymer film 12 is simply supported at its four sides, and the electrodes 15 and 16 are formed into the pattern based on the vibration function in a state of simply supporting the four sides of the piezoelectric polymer film 12. In the following fifth embodiment, a piezoelectric polymer film used in a cantilever state, in which only a single side is fixed, and a pattern of electrodes formed in this piezoelectric polymer film will be described.

Figure 12:
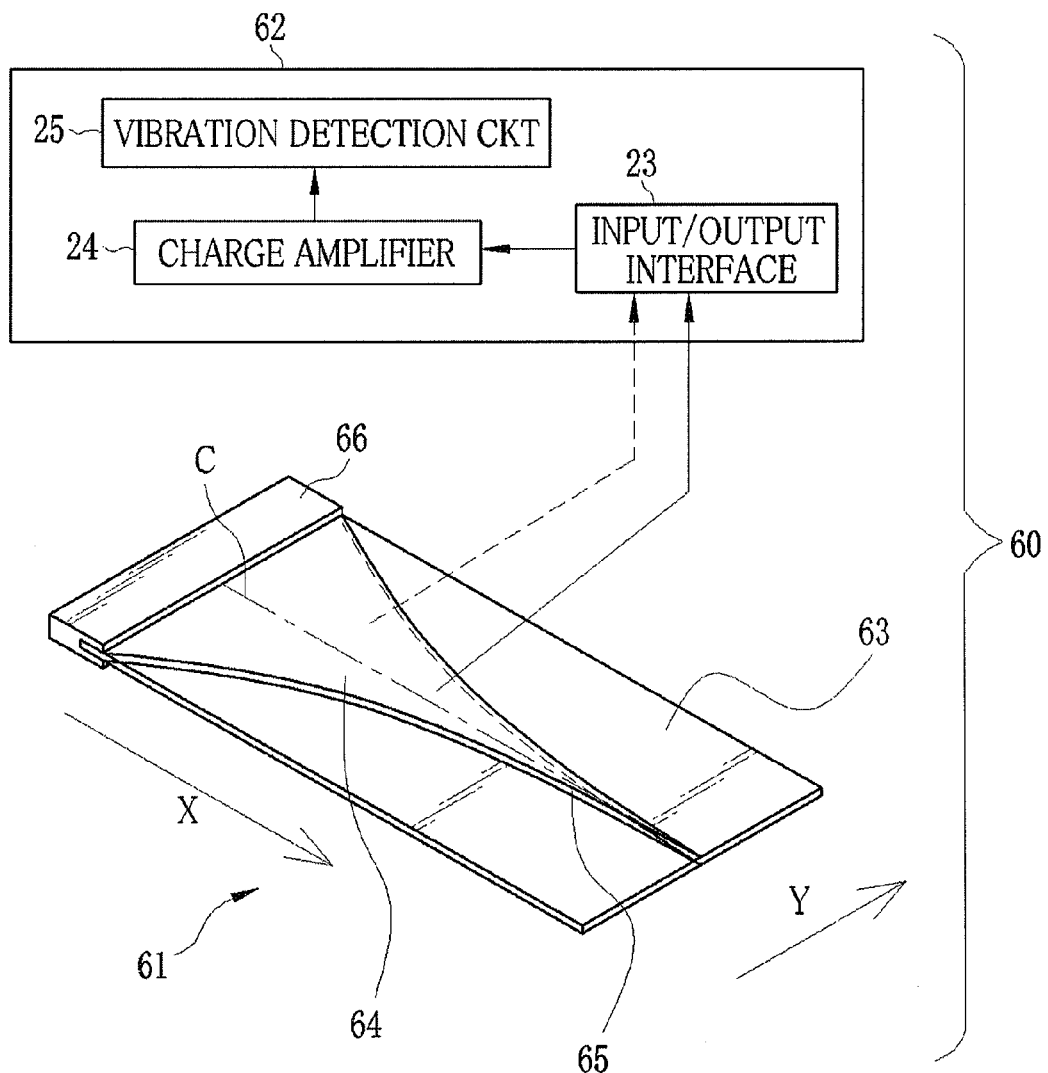
FIG. 12 is an explanatory view of a vibration sensor system according to a fifth embodiment.
Figure 13:
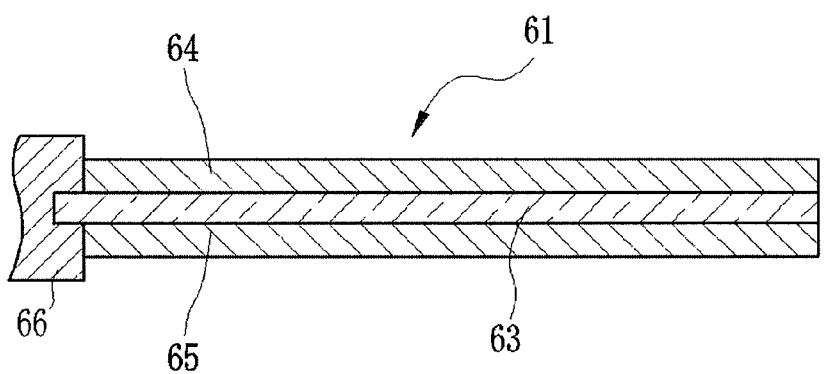
FIG. 13 is a cross-sectional view of a vibration sensor film according to the fifth embodiment.

FIGS. 12 and 13 show a vibration sensor film 61 having this piezoelectric polymer film. A vibration sensor system 60 is constituted of the vibration sensor film 61 and a control unit 62. The vibration sensor film 61 is constituted of a piezoelectric polymer film 63 and electrodes (sensor electrodes) 64 and 65.

The control unit 62 has a similar structure to the control unit 13 of the first embodiment. A charge amplifier 24 amplifies and integrates electric charge signals from the electrodes 64 and 65. Thus, the charge amplifier 24 produces an output voltage based on the inputted electric signals. A vibration detection circuit 25 detects from the output voltage a particular mode of vibration occurring in the piezoelectric polymer film 63.

The piezoelectric polymer film 63 is similar to the piezoelectric polymer film 14 according to the first embodiment, and is in the shape of a rectangular plane. A support member 66 fixes one end of the piezoelectric polymer film 63 in a longitudinal direction by catching the end from below and above.

In this embodiment, as with the first embodiment, the piezoelectric polymer film 63 itself is an object where vibration is to be detected. Thus, when vibration is applied to the piezoelectric polymer film 63, an output voltage is obtained from the electrodes 64 and 65, and a particular mode of vibration is detected. Otherwise, the piezoelectric polymer film 63 having the electrodes 64 and 65 may be glued on an object where vibration is to be detected. In this case, the support member 66 is attached to a fixed member. The same vibration as that of the object occurs in the piezoelectric polymer film 63, and hence the vibration sensor system 60 can detects the vibration of the object.

As shown in FIG. 13, the electrodes 64 and 65 are formed on both surfaces of the piezoelectric polymer film 63, and opposed to each other across the piezoelectric polymer film 63. These electrodes 64 and 65 are formed by an electrode patterning process, which is similar to that of the first embodiment.

Next, the pattern of the electrodes 64 and 65 formed on the piezoelectric polymer film 63 will be described. When an X direction refers to a longitudinal direction of the piezoelectric polymer film 63, and a Y direction refers to a transverse direction thereof (refer to FIG. 13), an output Q from the electrode 64 or 65 formed on the piezoelectric polymer film 63 is expressed by the following expression (1).

$$Q = \Gamma_0 \int_0^{L_x} \psi(x) \cdot e_{31} \frac{d^2 w(x)}{dx^2} dx \tag{1}$$

Wherein, $\psi(x)$ represents a function that expresses the shape of the electrode 64 or 65 along a central axis C in the Y direction, $e_{31}$ represents a piezoelectric stress constant (a constant expressing an electric charge amount or a displacement amount per unit stress), $\Gamma_0$ represents a sensor constant, and $w(x)$ represents a vibration displacement in the X direction.

The vibration displacement $w(x)$ can be expressed as a superposition of a plurality of modes of vibration. Thus, in consideration of vibration modes of order 1 to N, development of $w(x)$ yields the following expression (2).

$$w(x) = \sum_{i=1}^{N} \varphi_i(x) \cdot w_i = \varphi^T(x) \cdot w \tag{2}$$

Wherein, T represents transposition, $\phi_i(x)$ represents an eigenfunction of order i, and hence $\phi^T(x)$ is defined by the following expression (3). Above $w_i$ represents a displacement amplitude mode vector, and $w^T$ is defined by the following expression (3').

$$\phi^T(x) = [\phi_1(x)\ \phi_2(x)\ \phi_3(x) \ldots \phi_N(x)] \tag{3}$$

$$w^T = [w_1\ w_2\ w_3 \ldots w_N] \tag{3'}$$

Then, the following expression (4) is an equation of motion when a distribution excitation force f(x,t) acts on the Euler-Bernoulli beam under an arbitrary boundary condition.

$$EI \frac{\partial^4 w(x,t)}{\partial x^4} + \rho A \frac{\partial^2 w(x,t)}{\partial t^2} = f(x,t) \tag{4}$$

Wherein, E represents a longitudinal elastic modulus, I represents a second moment of area, $\rho$ represents a material density, A represents a cross-sectional area of the beam (piezoelectric polymer film 63), and t represents time.

It is analytically known that the eigenfunction $\phi_i(x)$ of a cantilever is expressed as follows:

$$\varphi_i(x) = \cosh k_i x - \cos k_i x - \frac{\cosh k_i L_x + \cos k_i L_x}{\sinh k_i L_x + \sin k_i L_x}(\sinh k_i x - \sin k_i x) \tag{5}$$

Wherein, $L_x$ represents the length of the piezoelectric polymer film 63 in the X direction (except for a section fixed by the support member 66). $k_i$ represents a wave number of order i, and is expressed by the following expression (5') with use of a fixed angular frequency $\omega_i$.

$$k_i^4 = \frac{\rho A}{EI} \omega_i^2 \tag{5'}$$

Now, substituting the expression (2) in the expression (1), the sensor output Q is expressed as follows:

$$Q = \Gamma_0 \int_0^{Lx} \psi(x) e_{31} \cdot \sum_{i=1}^{N} \frac{d^2 \varphi_i(x)}{dx} w_i dx \tag{6}$$

The shape of a sensor for detecting an m-th order vibration is defined by the following expression (7), that is, a second order differentiation of the expression (5).

$$\psi_m(x) = \frac{d^2 \varphi_m(x)}{dx} \tag{7}$$
$$= k_m^2 \left\{ \cosh k_m x + \cos k_m x - \frac{\cosh k_m L_x + \cos k_m L_x}{\sinh k_m L_x + \sin k_m L_x} (\sinh k_m x + \sin k_m x) \right\}$$

Substituting the expression (7) into the expression (6), differentiation yields the following expression (8).

$$Q = \Gamma_0 \cdot e_{31} \int_0^{Lx} \frac{d^2 \varphi_m(x)}{dx^2} \left\{ \frac{d^2 \varphi_1(x)}{dx^2} w_1 + \frac{d^2 \varphi_2(x)}{dx^2} w_2 + \ldots + \frac{d^2 \varphi_m(x)}{dx^2} w_m + \ldots + \frac{d^2 \varphi_N(x)}{dx^2} w_N \right\} dx \tag{8}$$

By applying orthogonality of modes to the expression (8), the following expression (9) is obtained.

$$Q = \Gamma_0 \cdot e_{31} \cdot w_m \int_0^{Lx} \frac{d^2 \varphi_m(x)}{dx^2} \cdot \frac{d^2 \varphi_m(x)}{dx^2} dx \tag{9}$$

It is apparent from the expression (9) that taking the second order differentiation of the eigenfunction (i.e. expression (7)) as a shape function allows to detect only a particular mode of vibration to be desired among an infinite number of modes of vibration. Therefore, a sensor compliant to such a shape function is ideal for detecting the particular mode of vibration.

Figure 14A:
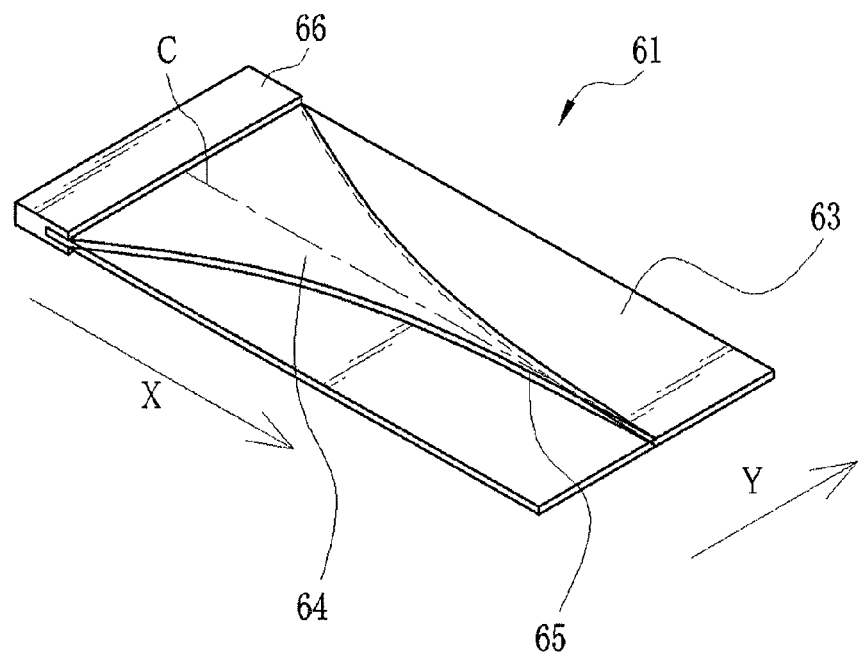
FIGS. 14A and 14B are perspective views of vibration sensor films having electrodes that are formed into patterns corresponding to a first-order vibration.
Figure 14B:
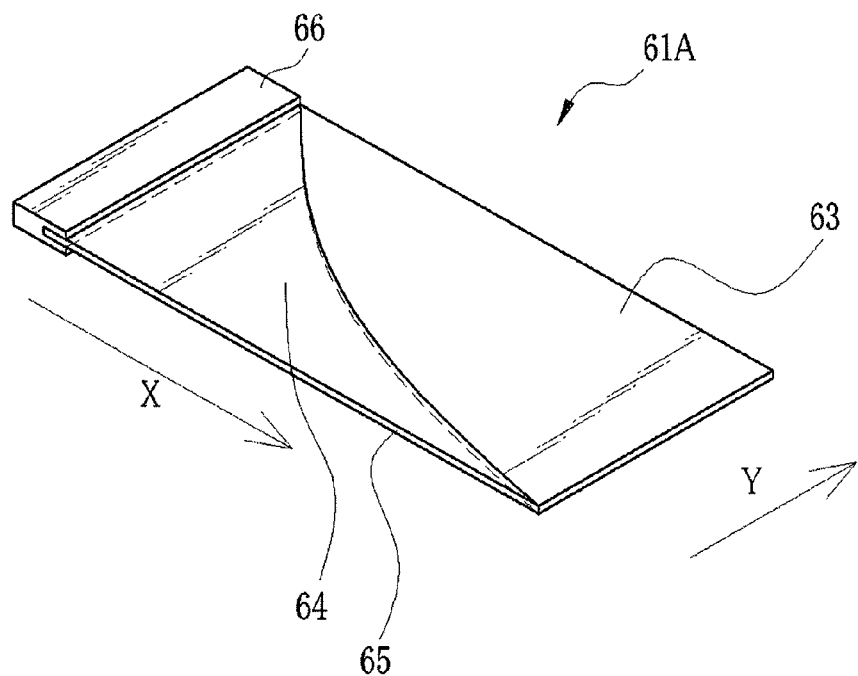
Figure 15A:
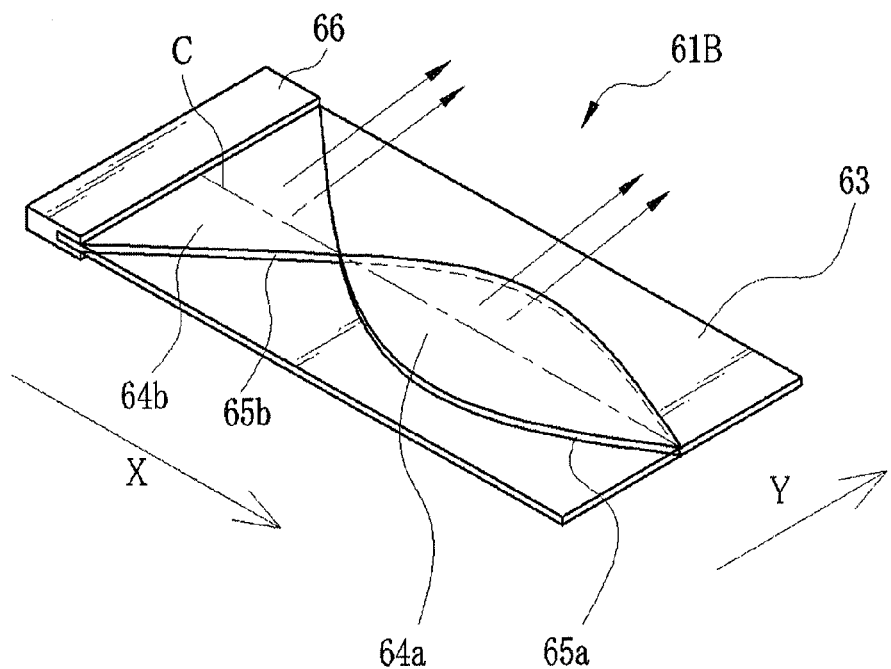
FIGS. 15A and 15B are perspective views of vibration sensor films having electrodes that are formed into patterns corresponding to a second-order vibration.
Figure 15B:
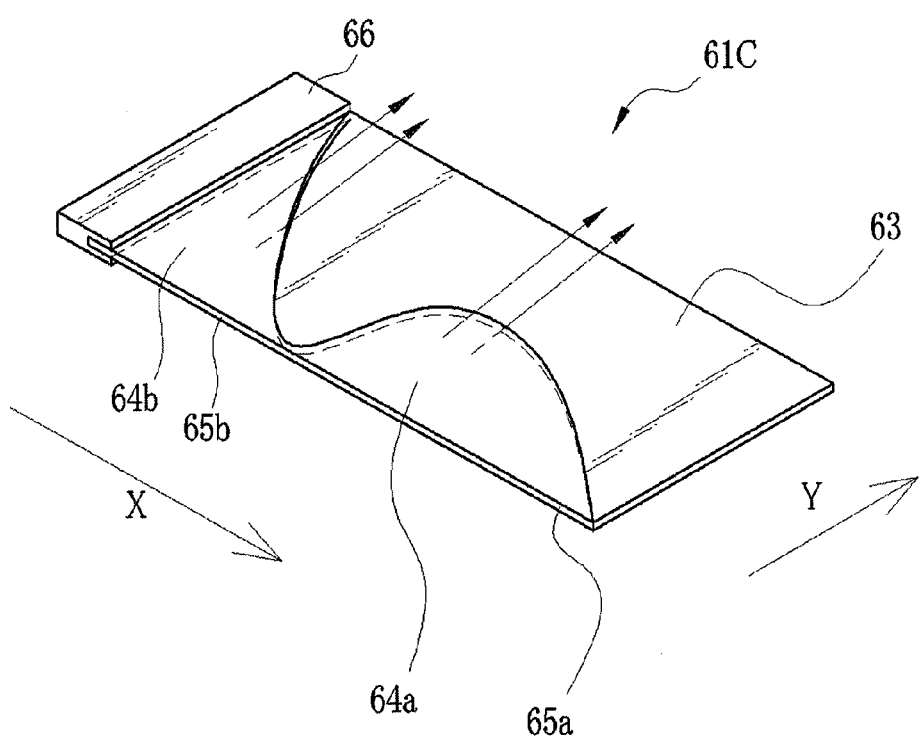

FIGS. 14A, 14B, 15A, and 15B show electrodes 64 and 65 that are formed into patterns corresponding to the shape function of the expression (7). In FIGS. 14A and 14B, the electrodes 64 and 65 are formed into a pattern corresponding to a first-order vibration on vibration sensor films 61 and 61A. The electrodes 64 and 65 are symmetric in FIG. 14A with respect to the central axis C of the piezoelectric polymer film 63 in the Y direction, and asymmetric in FIG. 14B. In a like manner, in FIGS. 15A and 15B, the electrodes 64 and 65 are formed on vibration sensor films 61B and 61C into a pattern corresponding to a second order vibration. The electrodes 64 and 65 are symmetric in FIG. 15A with respect to the central axis C, and asymmetric in FIG. 15B. In FIGS. 15A and 15B, outputs are separately taken out of electrode portions 64a, 64b, 65a, and 65b into which the electrodes 64 and 65 are divided by nodes of vibration (valley points of the profile). The outputs from the electrode portions 64a, 64b, 65a, and 65b are inputted to appropriate polarities of a charge amplifier 24 to detect the second mode of vibration.

As described above, since the electrodes are formed into the pattern corresponding to the particular mode of vibration in a cantilever state, the particular mode of vibration can be detected with high accuracy, as with the above first embodiment. Since the electrodes 64 and 65 are patterned in surfaces of the piezoelectric polymer film 63, eliminating the necessity of a base material such as a support plate is effective in reduction in the thickness of the vibration sensor films 61, 61A, 61B, and 61C.

Sixth Embodiment

Figure 16:
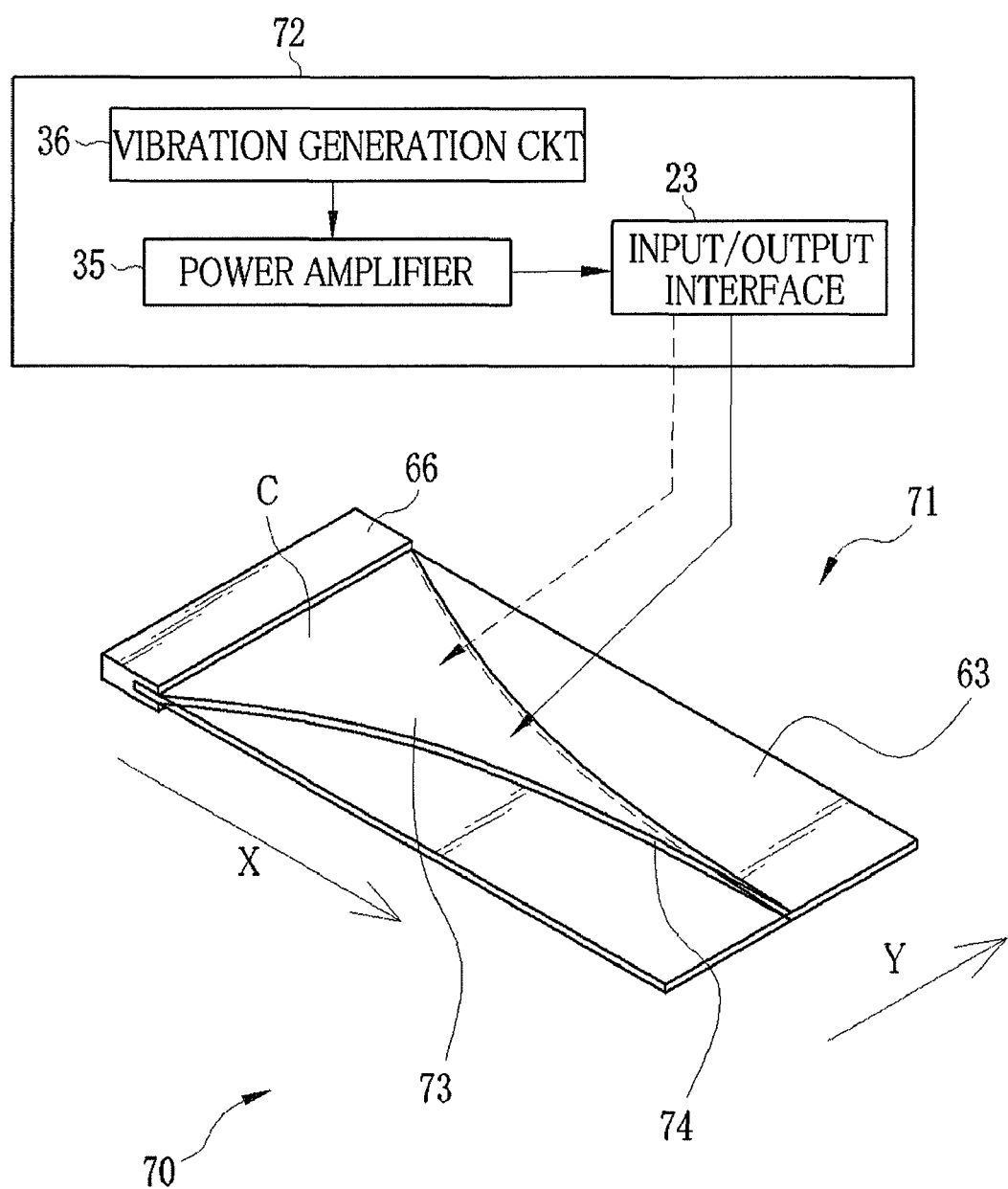
FIG. 16 is an explanatory view showing the structure of a vibration generator system according to a sixth embodiment.

The piezoelectric polymer film 63 in the cantilever state is used as the vibration sensor film 61 in the fifth embodiment, but is also usable as a vibration actuator film. FIG. 16 shows a vibration generator system 70 having this vibration actuator film. The vibration generator system 70 is constituted of a vibration actuator film 71 and a control unit 72. The vibration actuator film 71, which has the same structure as the vibration sensor film 61 according to the fifth embodiment, is constituted of a piezoelectric polymer film 63 and electrodes (drive electrodes) 73 and 74. The electrodes 73 and 74 are formed in the same pattern as the electrodes 64 and 65.

It is known that when voltage is applied to a piezoelectric polymer film having electrodes on both surfaces thereof, a displacement amount of the piezoelectric polymer film is expressed as follows:

$$w_m(x) = \frac{h^2 \cdot d}{EJ} V \cdot \sum_{N=M}^{Mm} \frac{U_n w_n^2}{(\omega N - \omega^2)} \varphi_m(x) \tag{10}$$

Wherein, h represents the thickness of the piezoelectric polymer film, $\varphi_m(x)$ represents a shape function (m is an order number), $U_n$ represents a coefficient, and V represents an applied voltage.

It is apparent from the above expressions (2) and (10) and the orthogonality of modes that forming the electrodes 73 and 74 into a pattern of the expression (7) actualizes generation of a particular mode of vibration (m-th order vibration). In other words, the pattern of the electrodes 73 and 74 of the vibration actuator film 71 becomes the same as that of the electrodes 64 and 65 of the vibration sensor film 61 according to the fifth embodiment.

The control unit 72 has a similar structure to that of the second embodiment. In this control unit 72, a control signal from a vibration generation circuit 36 is amplified by a power amplifier 35, and voltages of the amplified signal are inputted to the electrodes 73 and 74 of the piezoelectric polymer film 63 through an input/output interface 23. As described above, the electrodes 73 and 74 are patterned based on a particular mode of vibration in a cantilever state, so that the vibration actuator film 71 is driven to generate the particular mode of vibration. As with the second embodiment, since the electrodes 73 and 74 are patterned in surfaces of the piezoelectric polymer film 63, eliminating the necessity of a base material such as a support plate is effective in reduction in the thickness of the vibration actuator film 71.

Seventh Embodiment

Figure 17:
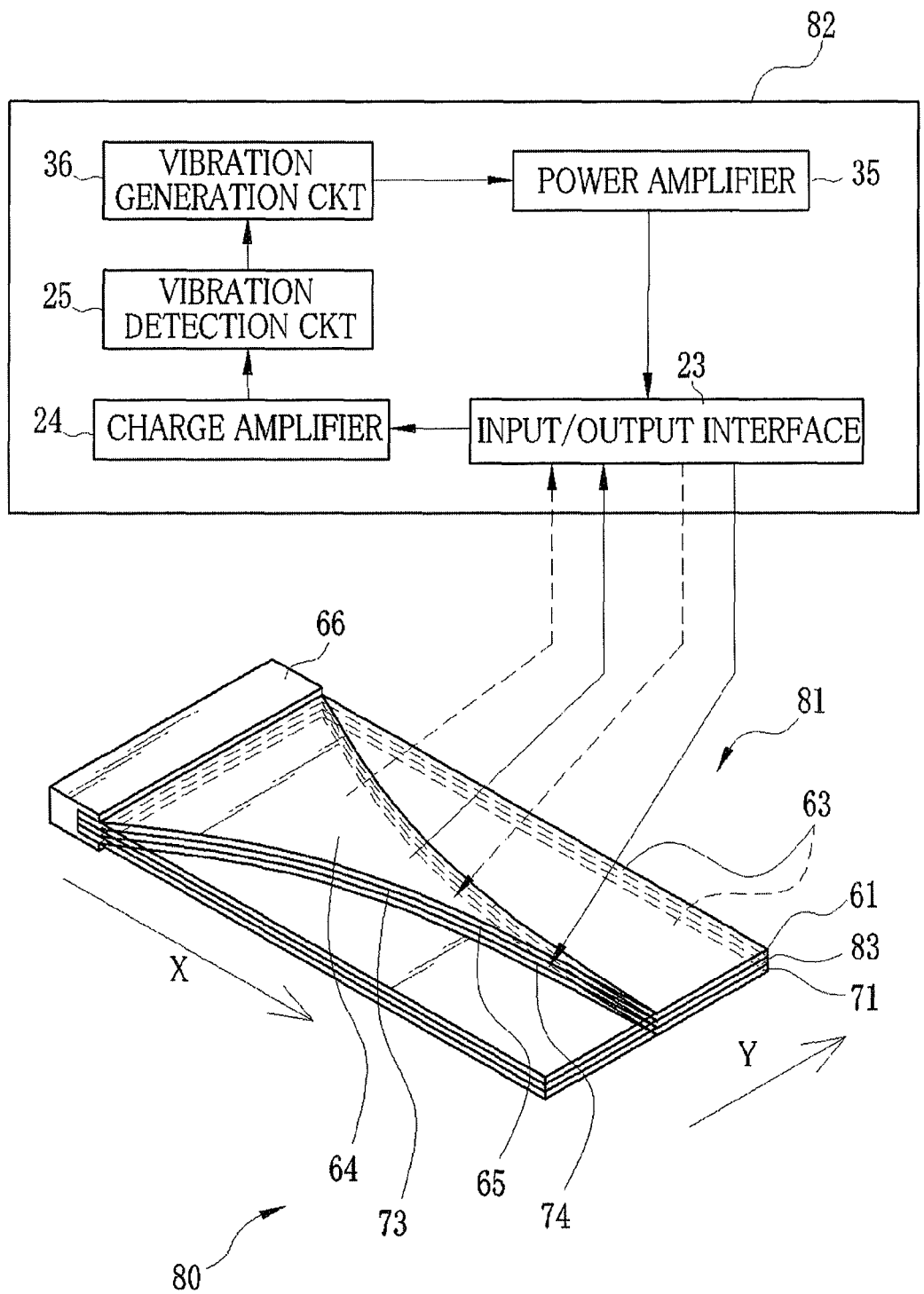
FIG. 17 is an explanatory view showing the structure of a vibration reduction system according to a seventh embodiment.

In the following seventh embodiment, a combination of the vibration sensor film 61 of the fifth embodiment and the vibration actuator film 71 of the sixth embodiment composes a multilayer vibration reduction film that detects a particular mode of vibration in a cantilever state, and counteracts this vibration. FIG. 17 shows a vibration reduction system 80 having this multilayer vibration reduction film. The vibration reduction system 80 is constituted of a multilayer vibration reduction film 81 and a control unit 82. The multilayer vibration reduction film 81 is constituted of a vibration sensor film 61 having the same structure as that of fifth embodiment, a vibration actuator film 71 having the same structure as that of the sixth embodiment, and an insulating layer 83 sandwiched between the vibration sensor film 61 and the vibration actuator film 71. The vibration sensor film 61 is glued on one surface of the insulating layer 83, and the vibration actuator film 71 is glued on the other surface thereof. The vibration sensor film 61, the insulating layer 83, and the vibration actuator film 71 are stacked in three layers. All of the vibration sensor film 61, the vibration actuator film 71, and the insulating layer 83 have the same outside shape. Electrodes 64 and 65 of the vibration sensor film 61 overlap with electrodes 73 and 74 of the vibration actuator film 71.

The control unit 72 has a similar structure to that of the third embodiment. An input/output interface 23 is connected to each of the electrodes 64, 65, 73, and 74. In this control unit 42, a charge amplifier 24 amplifies electric charge signals from the electrodes 64 and 65, and produces an output voltage. A vibration detection circuit 25 detects the particular mode of vibration that has occurred in the multilayer vibration reduction film 81. A vibration generation circuit 36 inputs a signal to a power amplifier 35 so as to counteract the detected vibration. The power amplifier 35 amplifies the signal, and voltages are applied to the electrodes 73 and 74 through the input/output interface 23. The application of the voltages to the electrodes 73 and 74 displaces and bens the piezoelectric polymer films 63, and generates vibration of opposite phase. The control unit 42 restrains the vibration that has occurred in the multilayer vibration reduction film 81 by feedback control.

Figure 18:
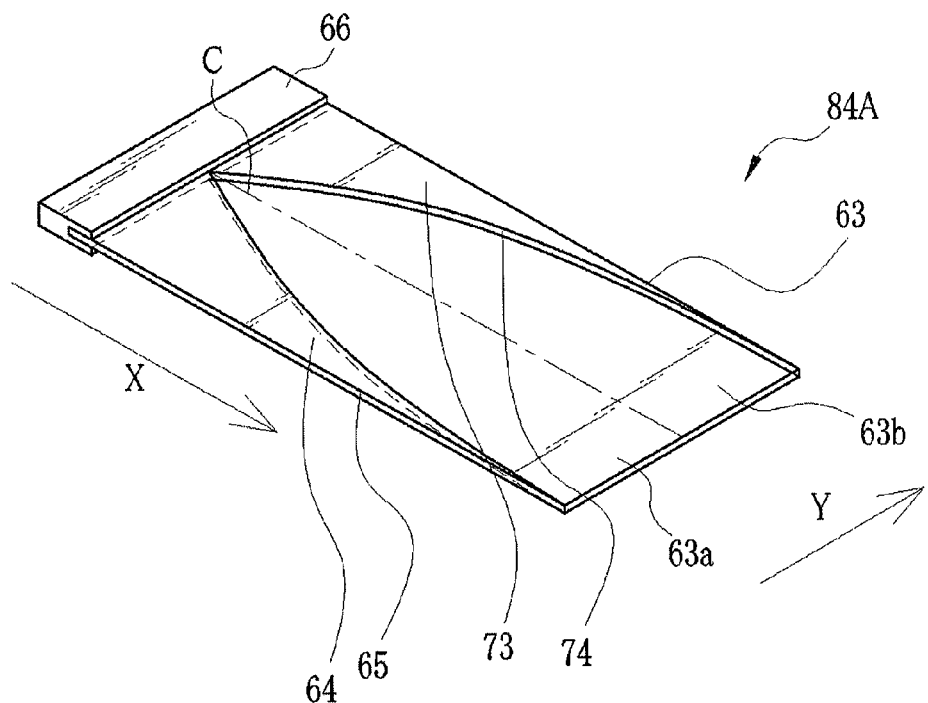
FIG. 18 is a perspective view of a vibration reduction film according to a first modification example of the seventh embodiment.

Instead of a stack of the vibration sensor film 61 and the vibration actuator film 71 constituting the multilayer vibration reduction film 81, two electrodes may be formed on the same surface of a piezoelectric polymer film. In this case, one of the electrodes may be used as a sensor electrode, and the other one may be used as a drive electrode. FIG. 18 shows a single-layer vibration reduction film 84A in a cantilever state. In this vibration reduction film 84A, a piezoelectric polymer film 63 is divided in two areas 63a and 63b at a central axis C in a Y direction. Sensor electrodes 64 and 65 are formed in the area 63a, and drive electrodes 73 and 74 are formed in the area 63b. The sensor electrode 64 and the drive electrode 73 are formed in a front surface of the piezoelectric polymer film 63, and the sensor electrode 65 and the drive electrode 74 are formed in a rear surface thereof. The sensor electrode 64 and the drive electrode 73 are symmetric to each other with respect to the central axis C, and the sensor electrode 65 and the drive electrode 74 are symmetric to each other with respect to the central axis C. A particular mode of vibration is detected by the sensor electrodes 64 and 65, as with the fifth embodiment. Then, a cancelling vibration of opposite phase is generated to counteract the detected vibration by application of voltages to the drive electrodes 73 and 74, as with the sixth embodiment. Since the sensor electrodes 64 and 65 and the drive electrodes 73 and 74 are formed in the single-layer piezoelectric polymer film 63, it is possible to further reduce the thickness of the vibration reduction film 84A.

Figure 19:
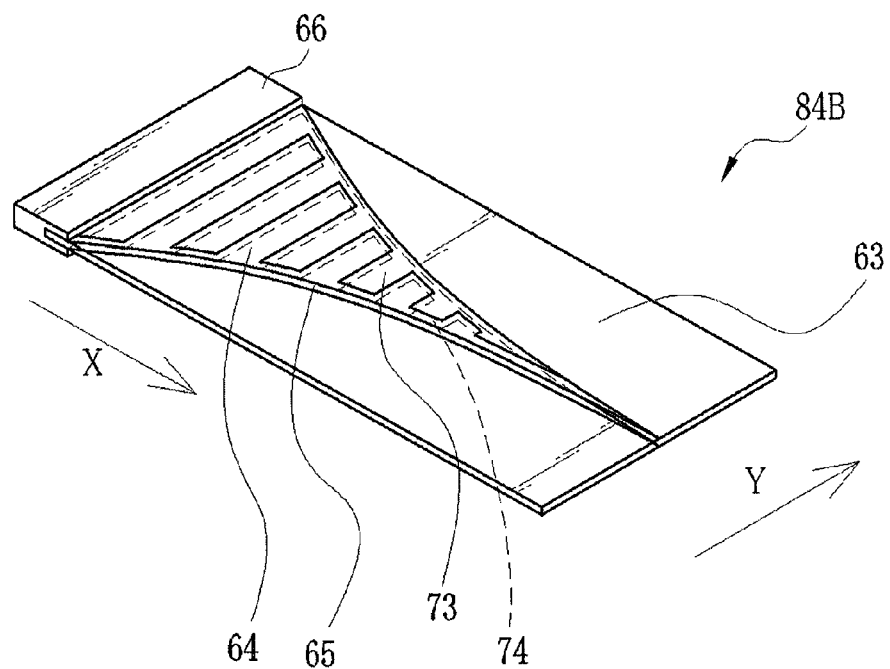
FIG. 19 is a perspective view of a vibration reduction film according to a second modification example of the seventh embodiment.

FIG. 19 shows a vibration production film 84B where a sensor electrode 64 and a drive electrode 73 are formed into a comb shape. Engagement of teeth of the sensor electrode 64 and teeth of the drive electrode 73 has the same outside shape as that of electrode 64 or 73 of the fifth or sixth embodiment. In a rear surface of the piezoelectric polymer film 63, a comb-shaped sensor electrode 65 and a comb-shaped drive electrode 74 that are engaged to each other are formed in a like manner.

Figure 20:
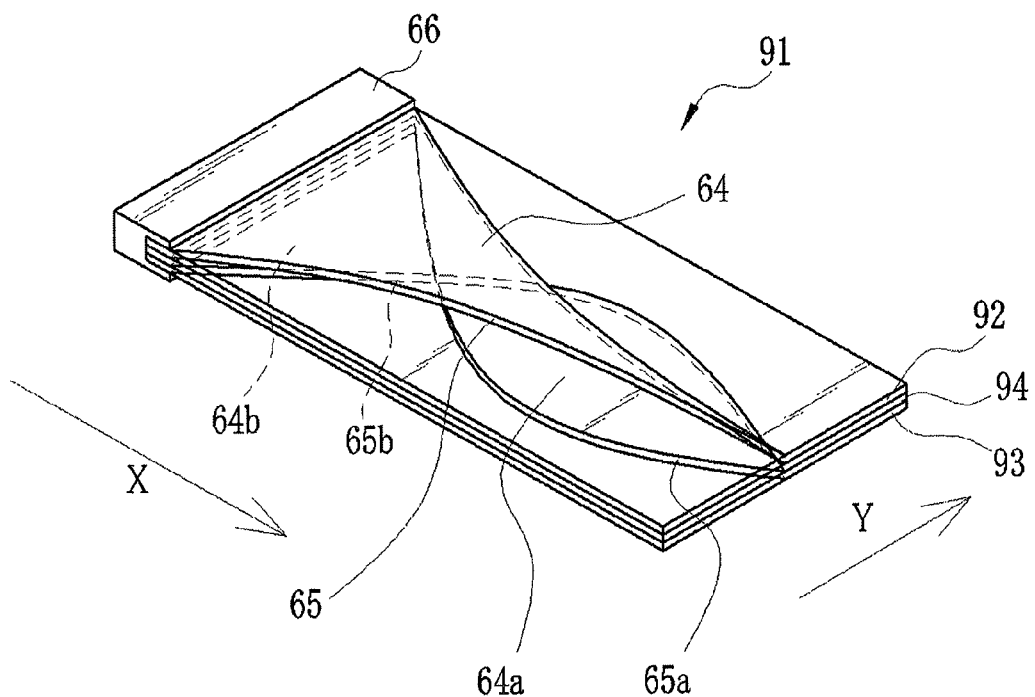
FIG. 20 is a perspective view of a multilayer vibration sensor film that detects a plurality of modes of vibration.

In a cantilever state, a multilayer vibration sensor film that can detect a plurality of modes of vibration, a multilayer vibration actuator film that can generate a plurality of modes of vibration, and a multilayer vibration reduction film that can detect a plurality of modes of vibration and counteract the vibration will be hereinafter described. FIG. 20 shows a multilayer vibration sensor film 91 that can detect a plurality of modes of vibration. The multilayer vibration sensor film 91 is constituted of three films, that is, a first vibration sensor film 92 for detecting a first-order vibration according to the fifth embodiment, a second vibration sensor film 93 for detecting a second-order vibration, and an insulating layer 94 sandwiched between the first vibration sensor film 92 and the second vibration sensor film 93. The first vibration sensor film 92 and the second vibration sensor film 93 are glued on both surfaces of the insulating layer 94. In this multilayer vibration sensor film 91, outputs are separately taken out of electrodes 64 and 65 of the first vibration sensor film 92 and electrode portions 64a, 64b, 65a, and 65b of the second vibration sensor film 93 to detect the first-order vibration and the second-order vibration.

To manufacture the multilayer vibration actuator film for generating a plurality of modes of vibration, in a like manner, a plurality of vibration actuator films that generates different modes of vibration from one another may be stacked via an insulating layer or insulating layers. Also, to manufacture the multilayer vibration reduction film for reducing a plurality of modes of vibration, a plurality of vibration reduction films as shown in FIG. 18 or 19 that can reduce different modes of vibration from one another may be stacked via an insulating layer or insulating layers.

Figure 21:
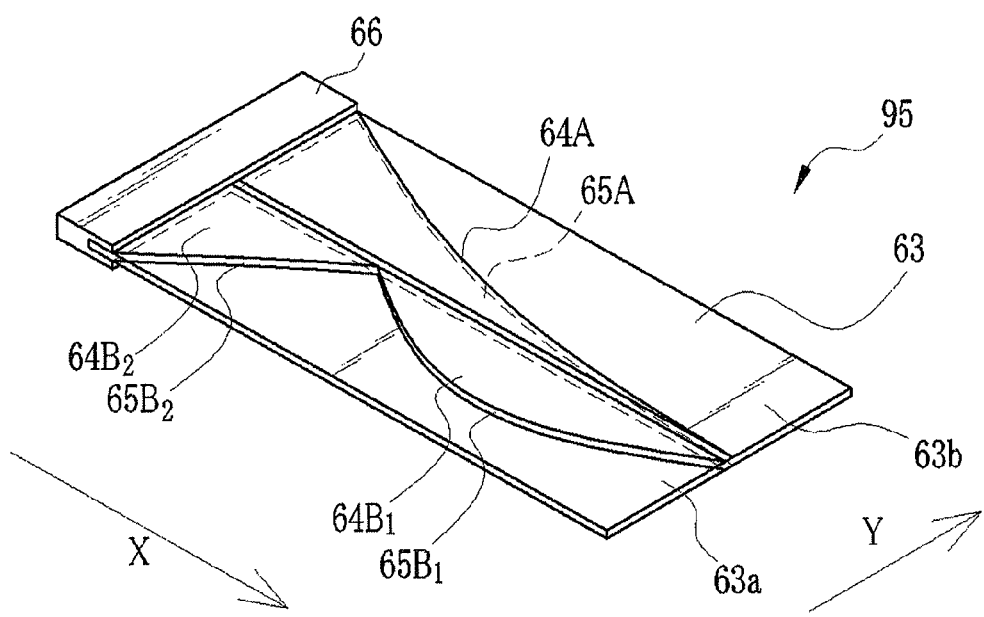
FIG. 21 is a perspective view of a vibration sensor film that detects a plurality of modes of vibration.

In a vibration sensor film 95 shown in FIG. 21, a piezoelectric polymer film 63 is divided in two areas 63a and 63b at a central axis C in a Y direction. Electrodes 64A and 65A corresponding to first-order vibration are formed in the area 63b, and electrodes 64B and 65B corresponding to second-order vibration are formed in the area 63a. No electrode pattern is formed in the vicinity of the central axis of the piezoelectric polymer film 63 so as to insulate the electrodes 64A and 65A from the electrodes 64B and 65B. Outputs are separately taken out of electrode portions $64B_1$, $64B_2$, $65B_1$, and $65B_2$ into which the electrodes 64B and 65B are divided by nodes of vibration (valley points), and the outputs are inputted into the same polarities of a charge amplifier as those of the fifth embodiment. Accordingly, the vibration sensor film 95 can detect a plurality of modes of vibration. Furthermore, forming the sensor electrodes for a plurality of modes of vibration in the single piezoelectric polymer film 63 allows further reduction in the thickness of the vibration sensor film 95.

In the above embodiments, the pattern or patterned shape as lines to define the shape of the electrodes are curves of a specific function such as a sine function. However, a pattern or patterned shape for electrodes in the invention may be combined lines formed by a great number of short straight lines as approximation lines of the curves, or combined lines as a group of known curves such as arcs of a circle or ellipse.

The vibration sensor films, the vibration actuator films, and the vibration reduction films according to this invention are suitably applicable to items that generate vibration and places where vibration reduction is desired, e.g. a noisy vehicle such as an automobile, a train, an airplane, and a ship, a building component such as a wall material and a windowpane, an office implement such as a panel and a partition.

Practical Example 1

Figure 22A:
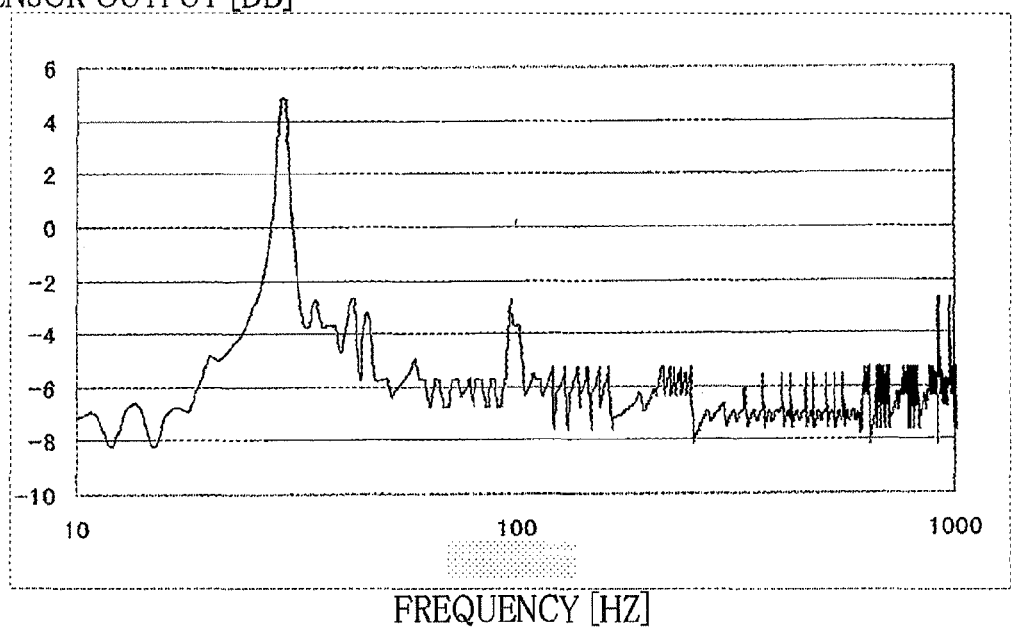
FIG. 22A is a graph showing output of (1st, 3rd)-order vibration by a vibration sensor film according to a practical example 1.
Figure 22B:
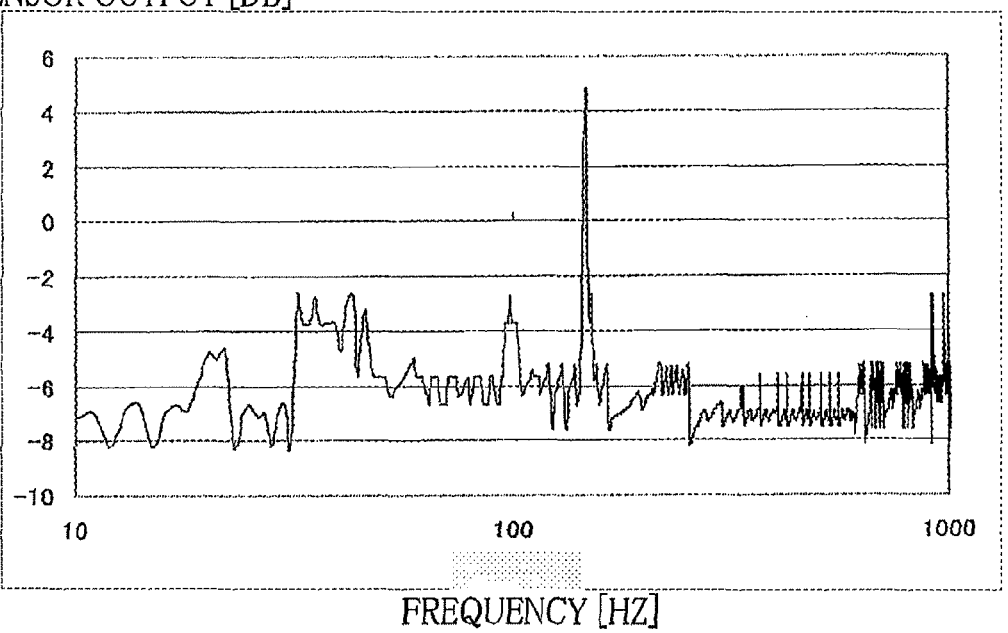
FIG. 22B is a graph showing output of (2nd, 3rd)-order vibration thereby.

A polyvinylidene fluoride (KYNAR 741, made by Arkema Inc.) was extruded at 220° C. into a sheet having a thickness of 400 μm and cooled. Then, the sheet was stretched by four times in a single axial direction at a stretch temperature of 130° C., to obtain a piezoelectric polymer film (PVDF film) having a thickness of 100 μm. This film was cut into a size of 0.33×0.175 m (Ly×Lx), and aluminum electrodes were formed in the whole surfaces of the film by vacuum evaporation. To generate piezoelectricity in the whole film, a voltage of 2 kV was applied to the film for 60 minutes at 80° C. A positive photoresist (FHi-560, made by Fujifilm Electronic Materials Co, Ltd.) was applied to the both surfaces of the film by spinner (at 1000 rpm for 60 seconds), and dried at 90° C. for 2 minutes. A photomask that had a pattern of a shape function $\pm F(y)=0.02\times\sin(3\times\pi\times y/Ly)$ from coordinates (Lx/3, 0) and (Lx×⅔, 0) of the piezoelectric polymer film was disposed on the film, and then ultraviolet rays of 0.5 J/cm$^2$ were applied thereto by using an exposure device (Aligner MAP-1200L, Dainippon Screen MFG. Co., Ltd.). The film was soaked in a developing solution (FHd-560, made by Fujifilm Electronic Materials Co., Ltd.) for 5 minutes, and was rinsed with distilled water. After that, the film was soaked in methanol for ten minutes to remove a resist layer remaining on the electrodes, and was dried at ambient temperature. Thus, the piezoelectric polymer film with the patterned electrodes was obtained. Exposed areas and unexposed areas of the piezoelectric polymer film were subjected to a continuity test with a tester. In the unexposed area, the aluminum electrode remained, and continuity was confirmed. In the exposed area, on the other hand, the electrode was removed, and continuity was not confirmed. The manufactured film was fixed at four sides by a knife edge, and made into a simple support state. A point excitation was applied to coordinates (0.14, 0.28) m of the piezoelectric polymer film as an external force within a frequency range of 10 to 1000 Hz without contact by using a magnet. Individual electrode portions were connected to a charge amplifier (CH-1100, made by Ono Sokki Co., Ltd.) with shielded wires, and electric charges occurring in the electrode portions were converted into a voltage signal. The voltage signal was inputted to a frequency characteristic analyzer (FRA5096, made by Taiyo Corporation), in order to verify responsivity as a sensor. (1st, 3rd)-order vibration is detected from the sum of outputs of the electrodes from the coordinates (Lx/3, 0) and the coordinates (Lx×⅔, 0). (2nd, 3rd)-order vibration, on the other hand, is detected from the difference of the outputs of the electrodes from the coordinates (Lx/3, 0) and the coordinates (Lx×⅔, 0). FIG. 22A shows output of the (1st, 3rd)-order vibration, and FIG. 22B shows output of the (2nd, 3rd)-order vibration.

Practical Example 2

Figure 23A:
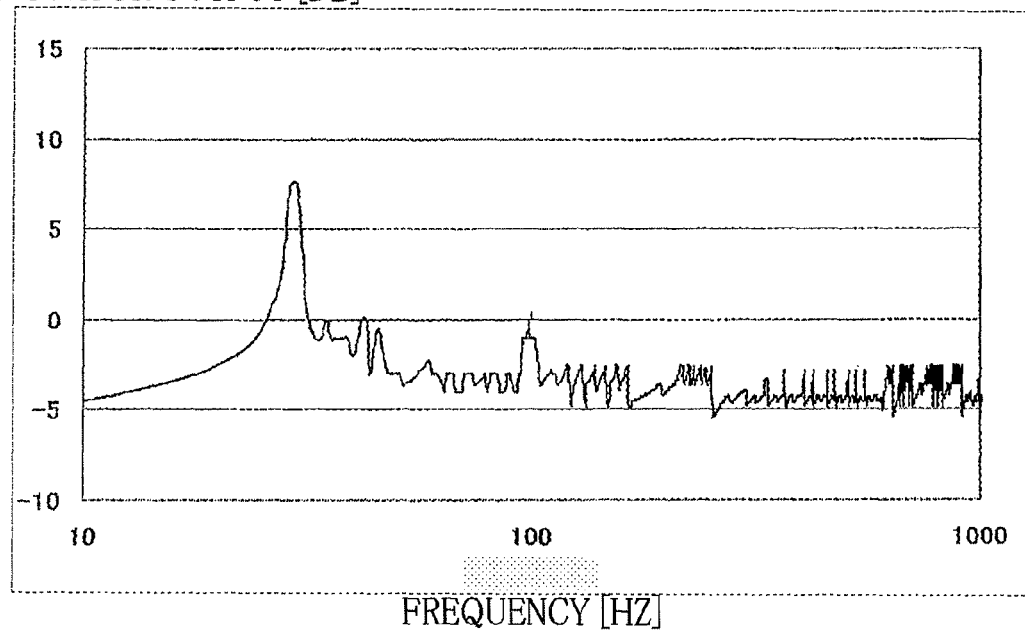
FIG. 23A is a graph showing measurement values of displacement due to (1st, 3rd)-order vibration by a vibration actuator film according to a practical example 2.
Figure 23B:
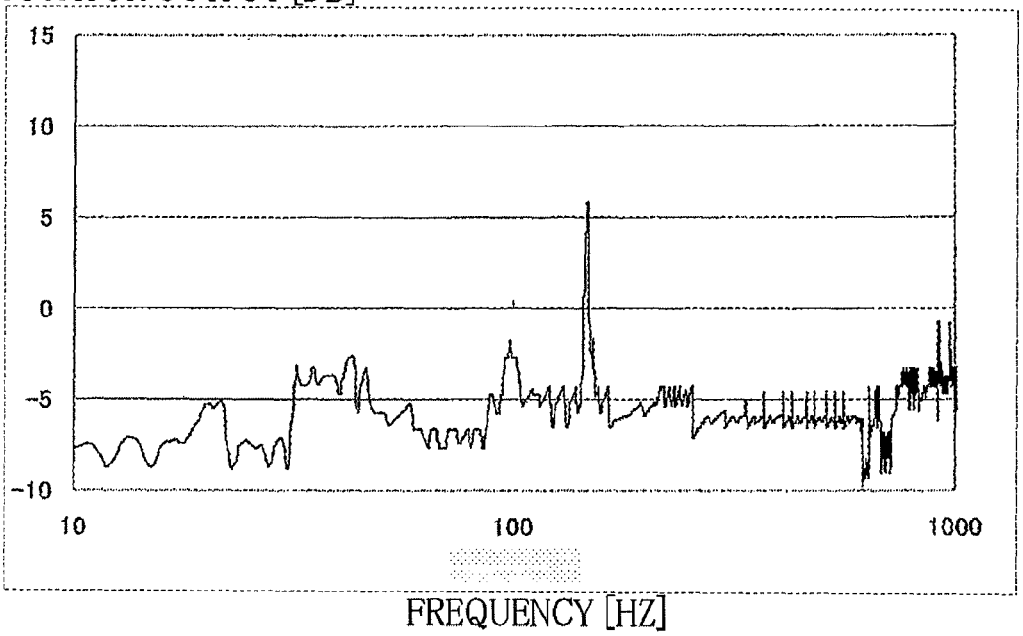
FIG. 23B is a graph showing measurement values displacement due to (2nd, 3rd)-order vibration thereby.

The actuator performance of the piezoelectric polymer film manufactured in the above practical example 1 was evaluated. The film manufactured in the practical example 1 was fixed at the four sides by the knife edge, and made into the simple support state. The electrode portions were connected to a power amplifier with the shielded wires. The electrode portions were further connected to the frequency characteristic analyzer (FRA5096, made by Taiyo Corporation), in order to verify responsivity as an actuator within a frequency range of 10 to 1000 Hz. A laser Doppler velocimeter (LV-50Z, made by Canon Inc.) was set up in a position 40 mm away from the surface of the piezoelectric polymer film, and an output from the velocimeter was inputted to the frequency characteristic analyzer (FRA5096, made by Taiyo Corporation). When voltages having the same phase in the X direction were applied to the electrodes, (1st, 3rd)-order vibration was generated. When voltages having the opposite phase in the X direction were applied to the electrodes, on the other hand, (2nd, 3rd)-order vibration was generated. FIG. 23A shows measurement values of displacement when the (1st, 3rd)-order vibration was generated, and FIG. 23B shows measurement values of displacement when the (2nd, 3rd)-order vibration was generated.

Practical Example 3

Two piezoelectric polymer films in which electrodes were patterned as with those of the practical example 1 were manufactured. A silicone adhesive (made by Nippon Resin) was applied to both surfaces of an insulative Kapton film (made by Teijin Ltd.) that had the same shape as the piezoelectric polymer films and a thickness of 50 μm. The piezoelectric polymer films with the patterned electrodes were glued on the both surfaces of the Kapton film, so that the piezoelectric polymer films and the Kapton film were made in three layers. One of the piezoelectric polymer films functioned as a sensor, and the other one of the piezoelectric polymer films functioned as an actuator. The sensor performance and actuator performance of the three-layered film were evaluated, as with the practical examples 1 and 2. As a result, peaks appeared at the same wavelengths as those of the practical examples 1 and 2, and hence it was found out that the three-layered film functioned as both of the sensor and the actuator.

Practical Example 4

Figure 24A:
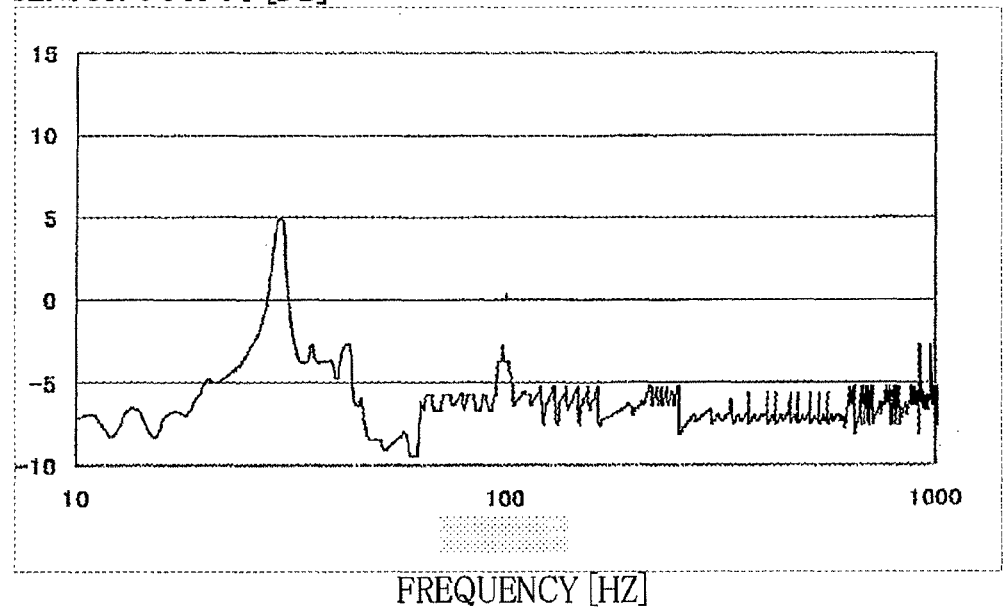
FIG. 24A is a graph showing output of (1st, 2nd)-order vibration by a vibration sensor film according to a practical example 4.
Figure 24B:
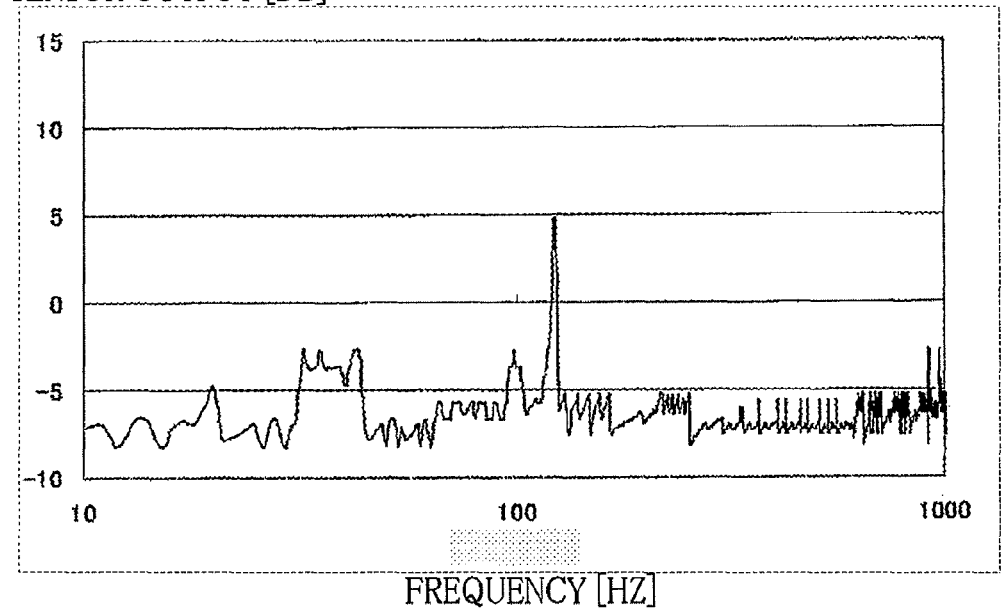
FIG. 24B is a graph showing output of (2nd, 2nd)-order vibration thereby.

Using the same method as the practical example 1, a photomask that had a pattern of a shape function $\pm F(y)=0.02\times\sin(2\times\pi\times y/Ly)$ from coordinates (Lx/3, 0) and coordinates (Lx×⅔, 0) was disposed on the film, and a piezoelectric polymer film was manufactured as a sensor/actuator for detecting/generating both of (1st, 2nd)-order vibration and (2nd, 2nd)-order vibration by the same procedure as the practical example 1. Then, the (1st, 3rd)-order and (2nd, 3rd)-order vibration sensor film manufactured in the practical example 1 was glued on one surface of a Kapton film by a method described in the practical example 3, and the above (1st, 2nd)-order and (2nd, 2nd)-order vibration sensor film was glued on the other surface of the Kapton film to make a three-layered film. Then, the sensor performance of the three-layered film was evaluated by the same method as the practical example 1. FIG. 24A shows output of the (1st, 2nd)-order vibration, and FIG. 24B shows output of the (2nd, 2nd)-order vibration.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A vibration sensor film comprising:
   a piezoelectric polymer film of a plate form; and
   at least one pair of first sensor electrodes formed on the piezoelectric polymer film into a pattern based on a first particular mode of vibration, one of the first sensor electrodes in the pair being disposed on one surface of the piezoelectric polymer film, the other one of the first sensor electrodes in the pair being disposed on the other surface of the piezoelectric polymer film, the pair of the first sensor electrodes for outputting a signal when the first particular mode of vibration is applied to the piezoelectric polymer film, and wherein a pair of second sensor electrodes are formed on the piezoelectric polymer film into a pattern based on a second particular mode of vibration, one of the second sensor electrodes in the pair is disposed on one surface of the piezoelectric polymer film, and the other one of the second sensor electrodes in the pair is disposed on the other surface of the piezoelectric polymer film.

2. The vibration sensor film according to claim 1, wherein the piezoelectric polymer film has a quadrilateral shape, and is supported by a quadrilateral support frame at four sides.

3. The vibration sensor film according to claim 1, wherein the piezoelectric polymer film has a quadrilateral shape, and is supported by a support member at one side.

4. The vibration sensor film according to claim 1, wherein the pair of the first sensor electrodes are formed on the surfaces of the piezoelectric polymer film by a photoresist method.

5. The vibration sensor film according to claim 1, wherein the pattern is expressed by a sine function.

6. The vibration sensor film according to claim 1, wherein the pattern is expressed by a second order differentiation of an eigenfunction.

7. The vibration sensor film according to claim 1, wherein pairs of third or more sensor electrodes are formed on the piezoelectric polymer film into patterns based on a third or more particular modes of vibration different from each other, ones of the third or more sensor electrodes in the pairs are disposed on one surface of the piezoelectric polymer film, and the other ones of the third or more sensor electrodes in the pairs are disposed on the other surface of the piezoelectric polymer film.

8. A vibration actuator film, comprising:
a piezoelectric polymer film of a plate form; and
a pair of first drive electrodes formed on the piezoelectric polymer film into a pattern based on a first particular mode of vibration, one of the first drive electrodes in the pair being disposed on one surface of the piezoelectric polymer film, the other one of the first drive electrodes in the pair being disposed on the other surface of the piezoelectric polymer film, a voltage being applied to the pair of the first drive electrodes to generate the first particular mode of vibration in the piezoelectric polymer film, and wherein a pair of second drive electrodes are formed on the piezoelectric polymer film into a pattern based on a second particular mode of vibration, one of the second drive electrodes in the pair is disposed on one surface of the piezoelectric polymer film, and the other one of the second drive electrodes in the pair is disposed on the other surface of the piezoelectric polymer film.

9. The vibration actuator film according to claim 8, wherein the piezoelectric polymer film has a quadrilateral shape, and is supported by a quadrilateral support frame at four sides.

10. The vibration actuator film according to claim 8, wherein the piezoelectric polymer film has a quadrilateral shape, and is supported by a support member at one side.

11. The vibration sensor film according to claim 8, wherein pairs of third or more sensor electrodes are formed on the piezoelectric polymer film into patterns based on a third or more particular modes of vibration different from each other, ones of the third or more sensor electrodes in the pairs are disposed on one surface of the piezoelectric polymer film, and the other ones of the third or more sensor electrodes in the pairs are disposed on the other surface of the piezoelectric polymer film.

12. A multilayer film, comprising:
a plurality of piezoelectric polymer films stacked on one another via an insulating layer; and
two or more pairs of electrodes formed on each of the piezoelectric polymer films into patterns based on particular modes of vibration different from each other, ones of the electrodes in the pairs being disposed on one surface of the piezoelectric polymer film, and the other ones of the electrodes in the pairs being disposed on the other surface of the piezoelectric polymer film.

13. The multilayer film according to claim 12, wherein the plurality of the piezoelectric polymer films are vibration sensor films for detecting different modes of vibration from one another.

14. The multilayer film according to claim 12, wherein the plurality of the piezoelectric polymer films are vibration actuator films for generating different modes of vibration from one another.

15. The multilayer film according to claim 12, wherein at least one of the plurality of the piezoelectric polymer films is a vibration sensor film for detecting the particular mode of vibration, at least another one of the plurality of the piezoelectric polymer films is a vibration actuator film for generating the particular mode of vibration, and the vibration actuator film generates a cancelling vibration having an opposite phase to that of the vibration detected by the vibration sensor film in order to counteract the detected vibration.

* * * * *